(12) United States Patent
Liu et al.

(10) Patent No.: US 12,108,417 B2
(45) Date of Patent: Oct. 1, 2024

(54) BANDWIDTH PART SWITCHING USING UNICAST, MULTICAST, AND BROADCAST BANDWIDTH PARTS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US); Prasad Reddy Kadiri, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 17/451,210

(22) Filed: Oct. 18, 2021

(65) Prior Publication Data
US 2022/0124675 A1 Apr. 21, 2022

Related U.S. Application Data

(60) Provisional application No. 63/094,566, filed on Oct. 21, 2020.

(51) Int. Cl.
| *H04W 72/30* | (2023.01) |
| *H04W 72/044* | (2023.01) |
| *H04W 72/23* | (2023.01) |
| *H04W 72/56* | (2023.01) |

(52) U.S. Cl.
CPC ......... *H04W 72/30* (2023.01); *H04W 72/044* (2013.01); *H04W 72/23* (2023.01); *H04W 72/56* (2023.01)

(58) Field of Classification Search
CPC ... H04W 72/30; H04W 72/044; H04W 72/23; H04W 72/56
See application file for complete search history.

(56) References Cited

U.S. PATENT DOCUMENTS

| 2023/0199739 A1* | 6/2023 | Zhou | H04W 72/232 370/329 |
| 2023/0422227 A1* | 12/2023 | Zhou | H04W 4/06 |
| 2024/0032070 A1* | 1/2024 | Zhou | H04W 72/232 |

* cited by examiner

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a first common frequency resource (CFR) configured for multicast downlink communications and associated with a first bandwidth part, and an indication of a second CFR configured for broadcast downlink communications and associated with a second bandwidth part. The UE may determine whether to switch a bandwidth part for receiving downlink communications based at least in part on the indication of the first CFR and the indication of the second CFR. Numerous other aspects are provided.

30 Claims, 12 Drawing Sheets

BANDWIDTH PART SWITCHING USING UNICAST, MULTICAST, AND BROADCAST BANDWIDTH PARTS

CROSS-REFERENCE TO RELATED APPLICATION

This patent application claims priority to U.S. Provisional Patent Application No. 63/094,566, filed on Oct. 21, 2020, entitled "BANDWIDTH PART SWITCHING USING UNICAST, MULTICAST, AND BROADCAST BANDWIDTH PARTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for bandwidth part switching using unicast, multicast, and broadcast bandwidth parts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving an indication of a first common frequency resource (CFR) configured for multicast downlink communications and associated with a first bandwidth part, and an indication of a second CFR configured for broadcast downlink communications and associated with a second bandwidth part; and determining whether to switch a bandwidth part for receiving downlink communications based at least in part on the indication of the first CFR and the indication of the second CFR.

In some aspects, a method of wireless communication performed by a base station includes transmitting, to a UE, an indication of a first CFR configured for multicast downlink communications and associated with a first bandwidth part, and an indication of a second CFR configured for broadcast downlink communications and associated with a second bandwidth part; and transmitting, to the UE, at least one of a multicast downlink communication in the first CFR or a broadcast downlink communication in the second CFR.

In some aspects, a UE for wireless communication includes a memory and one or more processors coupled to the memory, the memory and the one or more processors configured to: receive an indication of a first CFR configured for multicast downlink communications and associated with a first bandwidth part, and an indication of a second CFR configured for broadcast downlink communications and associated with a second bandwidth part; and determine whether to switch a bandwidth part for receiving downlink communications based at least in part on the indication of the first CFR and the indication of the second CFR.

In some aspects, a base station for wireless communication includes a memory and one or more processors coupled to the memory, the memory and the one or more processors configured to: transmit, to a UE, an indication of a first CFR configured for multicast downlink communications and associated with a first bandwidth part, and an indication of a second CFR configured for broadcast downlink communications and associated with a second bandwidth part; and transmit, to the UE, at least one of a multicast downlink communication in the first CFR or a broadcast downlink communication in the second CFR.

In some aspects, a non-transitory computer-readable medium storing a set of instructions for wireless communication includes one or more instructions that, when executed by one or more processors of UE, cause the UE to: receive an indication of a first CFR configured for multicast downlink communications and associated with a first bandwidth part, and an indication of a second CFR configured for broadcast downlink communications and associated with a second bandwidth part; and determine whether to switch a bandwidth part for receiving downlink communications based at least in part on the indication of the first CFR and the indication of the second CFR.

In some aspects, a non-transitory computer-readable medium storing a set of instructions for wireless communication includes one or more instructions that, when executed by one or more processors of a base station, cause the base station to: transmit, to a UE, an indication of a first CFR configured for multicast downlink communications and associated with a first bandwidth part, and an indication of a second CFR configured for broadcast downlink communications and associated with a second bandwidth part; and transmit, to the UE, at least one of a multicast downlink communication in the first CFR or a broadcast downlink communication in the second CFR.

In some aspects, an apparatus for wireless communication includes means for receiving an indication of a first CFR configured for multicast downlink communications and associated with a first bandwidth part, and an indication of a second CFR configured for broadcast downlink communications and associated with a second bandwidth part; and means for determining whether to switch a bandwidth part for receiving downlink communications based at least in part on the indication of the first CFR and the indication of the second CFR.

In some aspects, an apparatus for wireless communication includes means for transmitting, to a UE, an indication of a first CFR configured for multicast downlink communications and associated with a first bandwidth part, and an indication of a second CFR configured for broadcast downlink communications and associated with a second bandwidth part; and means for transmitting, to the UE, at least one of a multicast downlink communication in the first CFR or a broadcast downlink communication in the second CFR.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
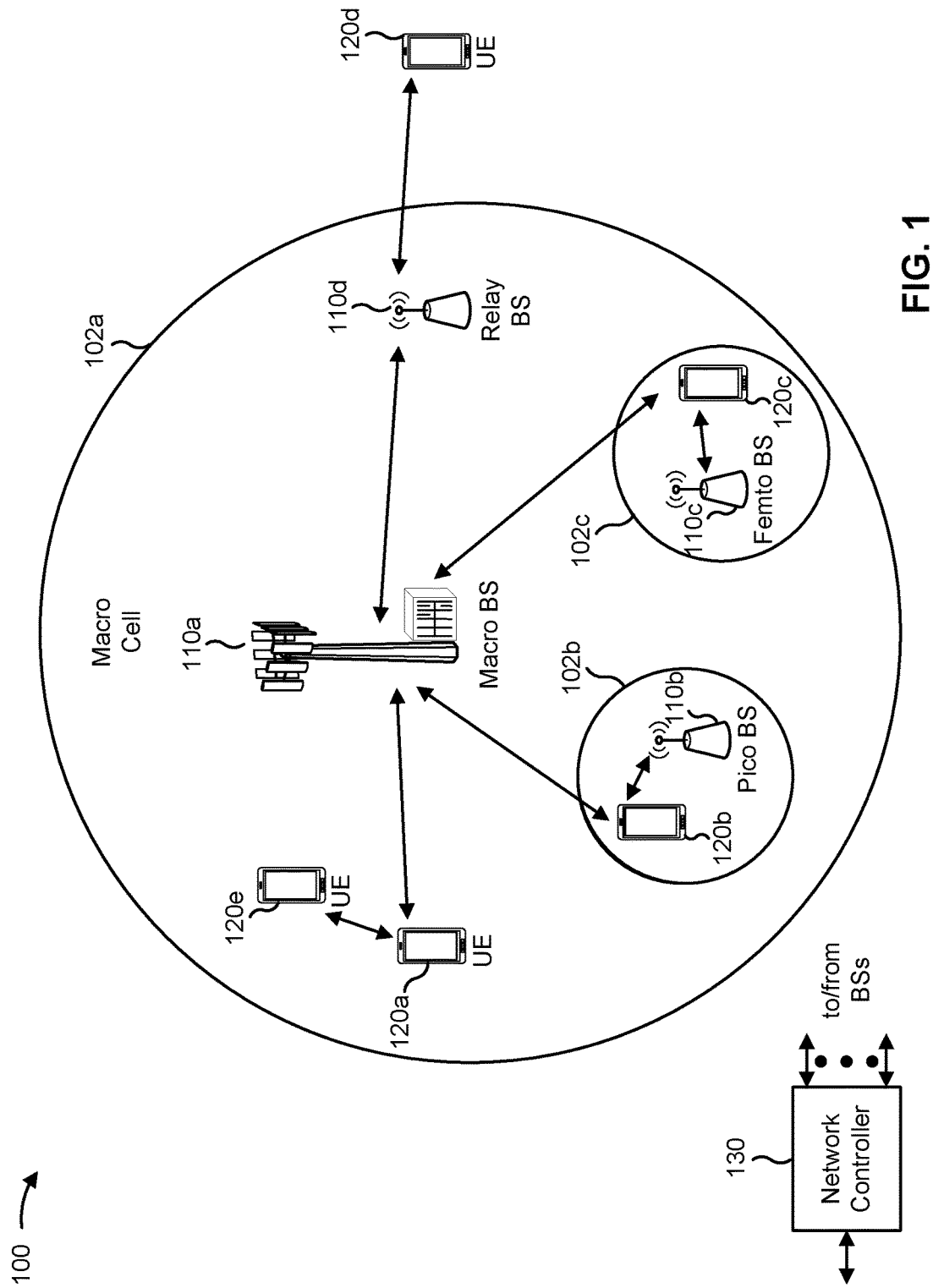
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
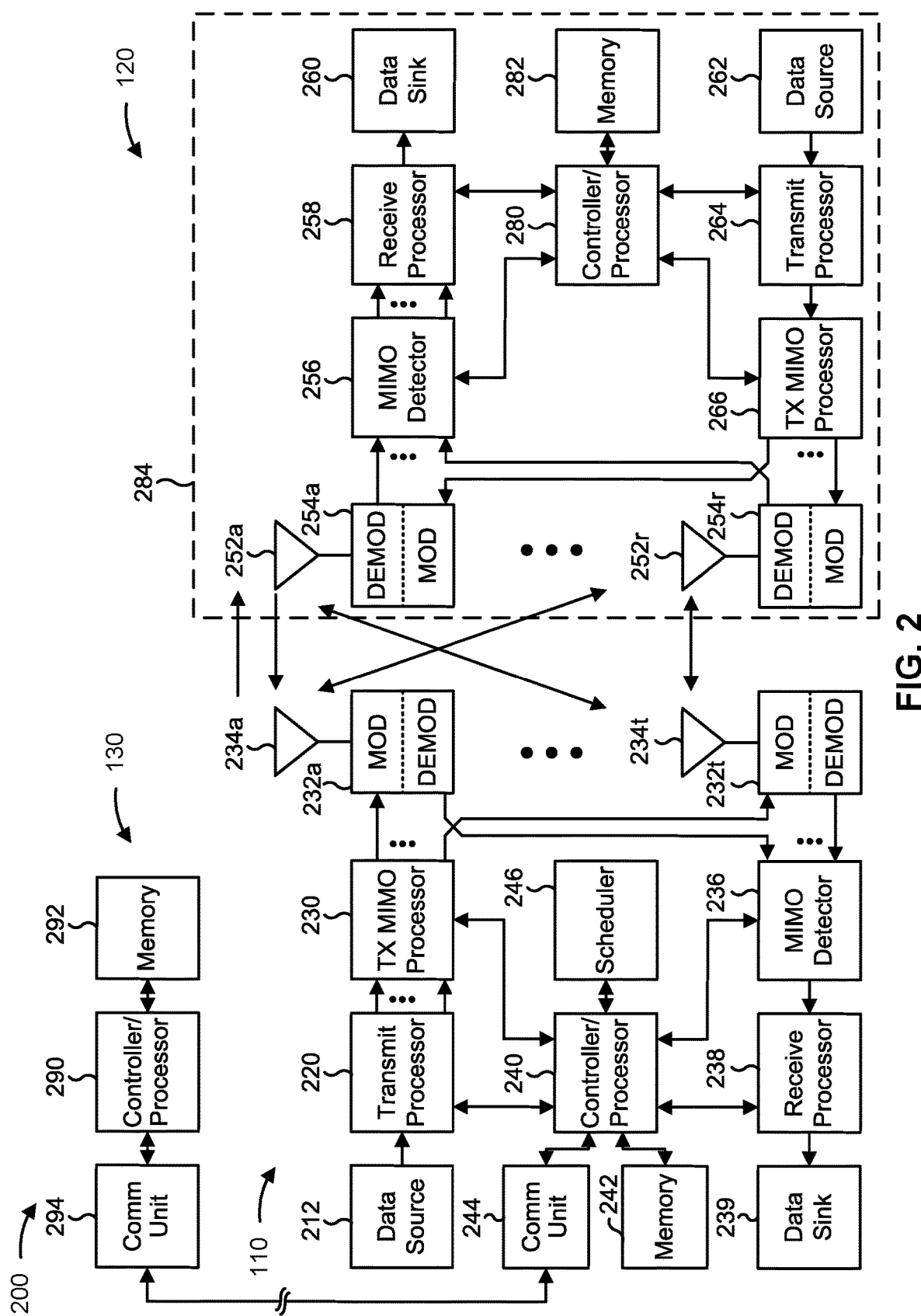
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, and/or any other component(s) of FIG. 2 may perform one or more techniques associated with bandwidth part switching using unicast, multicast, and broadcast bandwidth parts, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for receiving an indication of a first common frequency resource (CFR) configured for multicast downlink communications and associated with a first bandwidth part, and an indication of a second CFR configured for broadcast downlink communications and associated with a second bandwidth part; and/or means for determining whether to switch a bandwidth part for receiving downlink communications based at least in part on the indication of the first CFR and the indication of the second CFR. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for selecting the first-type broadcast CFR or the second-type broadcast CFR as the second CFR configured for broadcast downlink communications based at least in part on a capability or type of the UE.

In some aspects, the UE 120 includes means for switching to the first bandwidth part associated with the first CFR to receive one or more multicast downlink communications.

In some aspects, the UE 120 includes means for switching to the second bandwidth part associated with the second CFR to receive one or more broadcast downlink communications.

In some aspects, the UE 120 includes means for receiving an indication of an active bandwidth part; and/or means for switching from an initial bandwidth part to at least one of the first bandwidth part associated with the first CFR configured for multicast downlink communications or a unicast bandwidth part configured for unicast downlink communications based at least in part on the indication of the active bandwidth part; and/or means for switching from the at least one of the first bandwidth part associated with the first CFR or the unicast bandwidth part to the second bandwidth part associated with the second CFR based at least in part on expiration of a timer.

In some aspects, the UE 120 includes means for switching to the first bandwidth part associated with the first CFR.

In some aspects, the UE 120 includes means for receiving, in the first CFR, downlink control information scheduling a multicast downlink communication, wherein the downlink control information is associated with a group radio network temporary identifier; and/or means for setting or resetting the timer based at least in part on decoding the downlink control information associated with the group radio network temporary identifier.

In some aspects, the UE 120 includes means for receiving, in the first CFR, the multicast downlink communication scheduled by the downlink control information.

In some aspects, the UE 120 includes means for receiving at least one of a multicast downlink communication in the first CFR or a broadcast downlink communication in the second CFR.

In some aspects, the UE 120 includes means for switching to the unicast bandwidth part, wherein the first CFR is included within the unicast bandwidth part.

In some aspects, the UE 120 includes means for receiving at least one of downlink control information associated with a unicast radio network temporary identifier in the unicast bandwidth part or downlink control information associated with a group radio network temporary identifier in the first CFR; and/or means for resetting the timer based at least in part on decoding the downlink control information associated with the unicast radio network temporary identifier or decoding the downlink control information associated with the group radio network temporary identifier.

In some aspects, the UE 120 includes means for receiving, in the first CFR, downlink control information associated with a group radio network temporary identifier; and/or means for resetting the first timer based at least in part on decoding the downlink control information associated with the group radio network temporary identifier.

In some aspects, the UE 120 includes means for receiving, in the unicast bandwidth part, downlink control information associated with a unicast radio network temporary identifier; and/or means for resetting the second timer based at least in part on decoding the downlink control information associated with the unicast radio network temporary identifier.

In some aspects, the UE 120 includes means for receiving, in the first CFR, a multicast downlink communication; means for receiving, in the unicast bandwidth part, unicast downlink control information indicating dynamic bandwidth switching; and/or means for determining whether to perform the dynamic bandwidth switching based at least in part on a priority associated with a unicast communication scheduled by the unicast downlink control information and a priority associated with the multicast downlink communication.

In some aspects, the UE 120 includes means for receiving, in the second CFR while in a radio resource control idle mode or a radio resource control inactive mode, a broadcast downlink communication.

In some aspects, the UE 120 includes means for transmitting, to a base station, an indication of a maximum number of configured multicast CFRs for the UE.

In some aspects, the UE 120 includes means for transmitting, to the base station, an indication of a maximum number of dormant multicast CFRs for the UE.

In some aspects, the UE 120 includes means for transmitting, to the base station, an indication of a maximum number of activated multicast CFRs to be monitored simultaneously by the UE.

In some aspects, the base station 110 includes means for transmitting, to a UE, an indication of a first CFR configured for multicast downlink communications and associated with a first bandwidth part, and an indication of a second CFR configured for broadcast downlink communications and associated with a second bandwidth part; and/or means for transmitting, to the UE, at least one of a multicast downlink communication in the first CFR or a broadcast downlink communication in the second CFR. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for transmitting one or more multicast downlink communications in the first CFR.

In some aspects, the base station 110 includes means for transmitting one or more broadcast downlink communications in the second CFR.

In some aspects, the base station 110 includes means for transmitting, to the UE, an indication of an active bandwidth part, wherein the active bandwidth part is the first bandwidth part associated with the first CFR configured for multicast downlink communications or a unicast bandwidth part configured for unicast downlink communications.

In some aspects, the base station 110 includes means for transmitting, to the UE in the first CFR, downlink control information scheduling a multicast downlink communication, wherein the downlink control information is associated with a group radio network temporary identifier; and/or means for transmitting, to the UE in the first CFR, the multicast downlink communication scheduled by the downlink control information.

In some aspects, the base station 110 includes means for transmitting, to the UE, at least one of downlink control information associated with a unicast radio network temporary identifier in the unicast bandwidth part or downlink control information associated with a group radio network temporary identifier on the first CFR.

In some aspects, the base station 110 includes means for transmitting a broadcast downlink communication to the UE in the second CFR while the UE is in a radio resource control idle mode or a radio resource control inactive mode.

In some aspects, the base station 110 includes means for receiving, from the UE, an indication of a maximum number of configured multicast CFRs for the UE.

In some aspects, the base station 110 includes means for receiving, from the UE, an indication of a maximum number of dormant multicast CFRs for the UE.

In some aspects, the base station 110 includes means for receiving, from the UE, an indication of a maximum number of activated multicast CFRs to be monitored simultaneously by the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
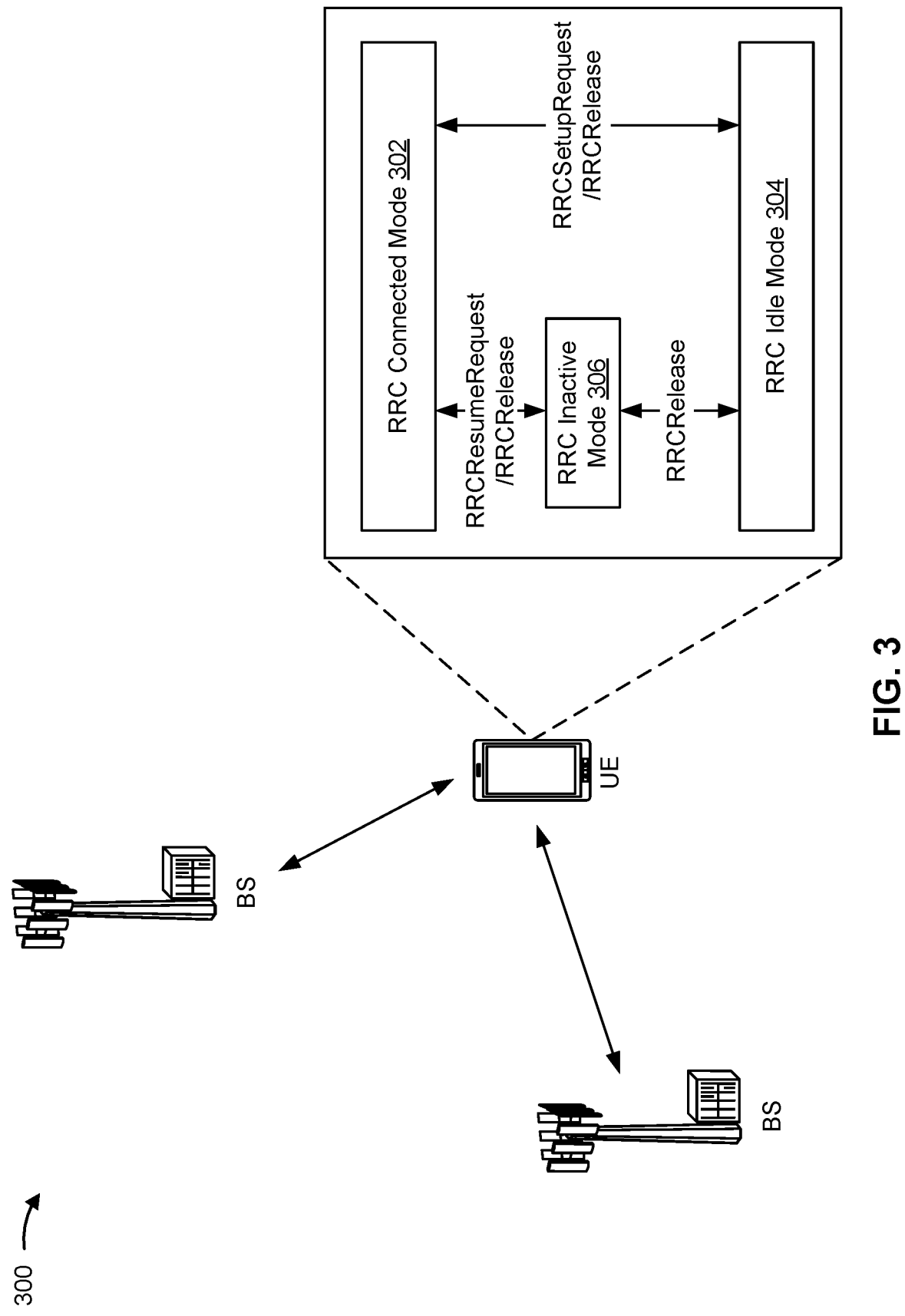
FIG. 3 is a diagram illustrating an example of a wireless network in which a UE may support additional communication modes, in accordance with the present disclosure.

FIG. 3 illustrates an example 300 of a wireless network (e.g., wireless network 100) in which a UE (e.g., UE 120) may support additional communication modes, in accordance with the present disclosure. The UE may be communicatively connected with one or more base stations in the wireless network. For example, the UE may be connected to the one or more base stations in a dual connectivity configuration. In this case, a first base station may serve the UE as a master node and a second base station may serve the UE as a secondary node.

As illustrated in FIG. 3, the UE may support a connected communication mode (e.g., a radio resource control (RRC) connected mode 302), an idle communication mode (e.g., an RRC idle mode 304), and/or an inactive communication mode (e.g., an RRC inactive mode 306). The RRC inactive mode 306 may functionally reside between the RRC connected mode 302 and the RRC idle mode 304.

The UE may transition between different modes based at least in part on various commands and/or communications received from the one or more base stations. For example, the UE may transition from the RRC connected mode 302 or the RRC inactive mode 306 to RRC idle mode 304 based at least in part on receiving an RRCRelease communication. As another example, the UE may transition from RRC connected mode 302 to RRC inactive mode 306 based at least in part on receiving an RRCRelease with suspendConfig communication. As another example, the UE may transition from RRC idle mode 304 to RRC connected mode 302 based at least in part on receiving an RRCSetupRequest communication. As another example, the UE may transition from RRC inactive mode 306 to RRC connected mode 302 based at least in part on receiving an RRCResumeRequest communication.

When transitioning to RRC inactive mode 306, the UE and/or the one or more base stations may store a UE context (e.g., an access stratum (AS) context, higher-layer configurations, or the like). This permits the UE and/or the one or more base stations to apply the stored UE context when the UE transitions from RRC inactive mode 306 to RRC connected mode 302 in order to resume communications with the one or more base stations, which reduces latency of transitioning to RRC connected mode 302 relative to transitioning to the RRC connected mode 302 from RRC idle mode 304.

In some cases, the UE may communicatively connect with a new master node when transitioning from RRC idle mode 304 or RRC inactive mode 306 to RRC connected mode 302 (e.g., a master node that is different from the last serving master node when the UE transitioned to RRC idle mode 304 or RRC inactive mode 306). In this case, the new master node may be responsible for identifying a secondary node for the UE in the dual connectivity configuration.

As indicated above, FIG. 3 is provided as an example. Other examples may differ from what is described with regard to FIG. 3.

A bandwidth part (BWP) is a contiguous set of physical resource blocks (PRBs) on a given carrier. As used herein, "BWP" may refer to a configured BWP, a virtual BWP, a common frequency resource (CFR), or a common frequency band. In NR, for a UE in the RRC connected mode may typically be configured with a maximum of 4 BWPs for downlink and uplink communications, but at a given point in time one BWP may be active for downlink and one BWP may be active for uplink. BWP switching may be used to switch between the configured BWPs for downlink and/or uplink communications. BWP switching may be triggered by dynamic activation or deactivation of a BWP explicitly indicated in unicast downlink control information (DCI). BWP switching may also be triggered by timer-based BWP activation or deactivation that causes a UE to switch the active BWP for the UE to a default BWP. For example, the default BWP may be an initial BWP configured for the UE.

NR supports a dedicated time for timer-based active BWP switching to the default BWP. For frequency division duplexing (FDD), the UE may start the timer when the UE switches the active downlink BWP to a downlink BWP other than the default BWP. The UE may start a timer or restart the timer to an initial timer duration when the UE successfully decodes a PDCCH addressed to UE-specific RNTI (e.g., cell radio network temporary identifier (C-RNTI) or configured scheduling RNTI (CS-RNTI)) to schedule a physical downlink shared channel (PDSCH) communication on or for the active DL BWP. The UE may switch the active downlink BWP to the default BWP when the time expires. For time division duplexing (TDD), the UE may start the timer when the UE switches an active downlink/uplink BWP pair to a downlink/uplink BWP pair other than a default downlink/uplink BWP pair. The UE may start a timer or restart the timer to the initial value when the UE successfully decodes a PDCCH addressed to UE-specific RNTI (e.g., C-RNTI or CS-RNTI) to schedule a PDSCH communication and a physical uplink shared channel (PUSCH) communication is on or for the active downlink/uplink BWP pair. The UE may switch the active downlink/uplink BWP pair to the default downlink/uplink BWP pair when the timer expires. In some cases, the timer may be configured to have a granularity of 1 millisecond (ms) (e.g., 1 subframe) for the sub-6 GH or FR1 band, or to have a granularity of 0.5 ms (e.g., half subframe) for the millimeter wave or FR2 band. In some case, the timer may be configured to have a duration of 50 ms.

Monitoring a wide bandwidth for downlink communications may result in high power consumption by UEs. Configuring BWPs and BWP switching may enable UEs to operate within a smaller bandwidth, and therefore reduce power consumption. Furthermore, BWPs may be configured for UEs with limited bandwidth capabilities to enable the UEs to transmit and/or receive within the limited bandwidths associated with the UEs. However, BWP configuration and switching is currently supported for unicast communications, but not for multicast or broadcast communications. Accordingly, the power saving resulting from BWP configuration and switching may not be realized for UEs that support unicast, multicast, and broadcast communications.

Some techniques and apparatuses described herein enable BWP switching using unicast, multicast, and broadcast BWPs. In some aspects, a UE may receive an indication of a BWP/CFR associated with multicast downlink communications and an indication of a BWP/CFR associated with broadcast downlink communications. The UE may determine whether to switch a BWP/CFR for receiving downlink communications based at least in part on the indication of the BWP/CFR associated with multicast downlink communications and the indication of the BWP/CFR associated with broadcast downlink communications. In some aspects, the indications may configure a multicast BWP/CFR for the UE in an RRC connected mode and a broadcast BWP/CFR for the UE in the RRC connected mode, an RRC idle mode, and an RRC inactive mode. As a result, the UE may support BWP/CFR switching for unicast, multicast, and broadcast downlink communications. Therefore, power consumption associated with the UE monitoring and receiving unicast, multicast, and broadcast downlink communications may be reduced.

Figure 4:
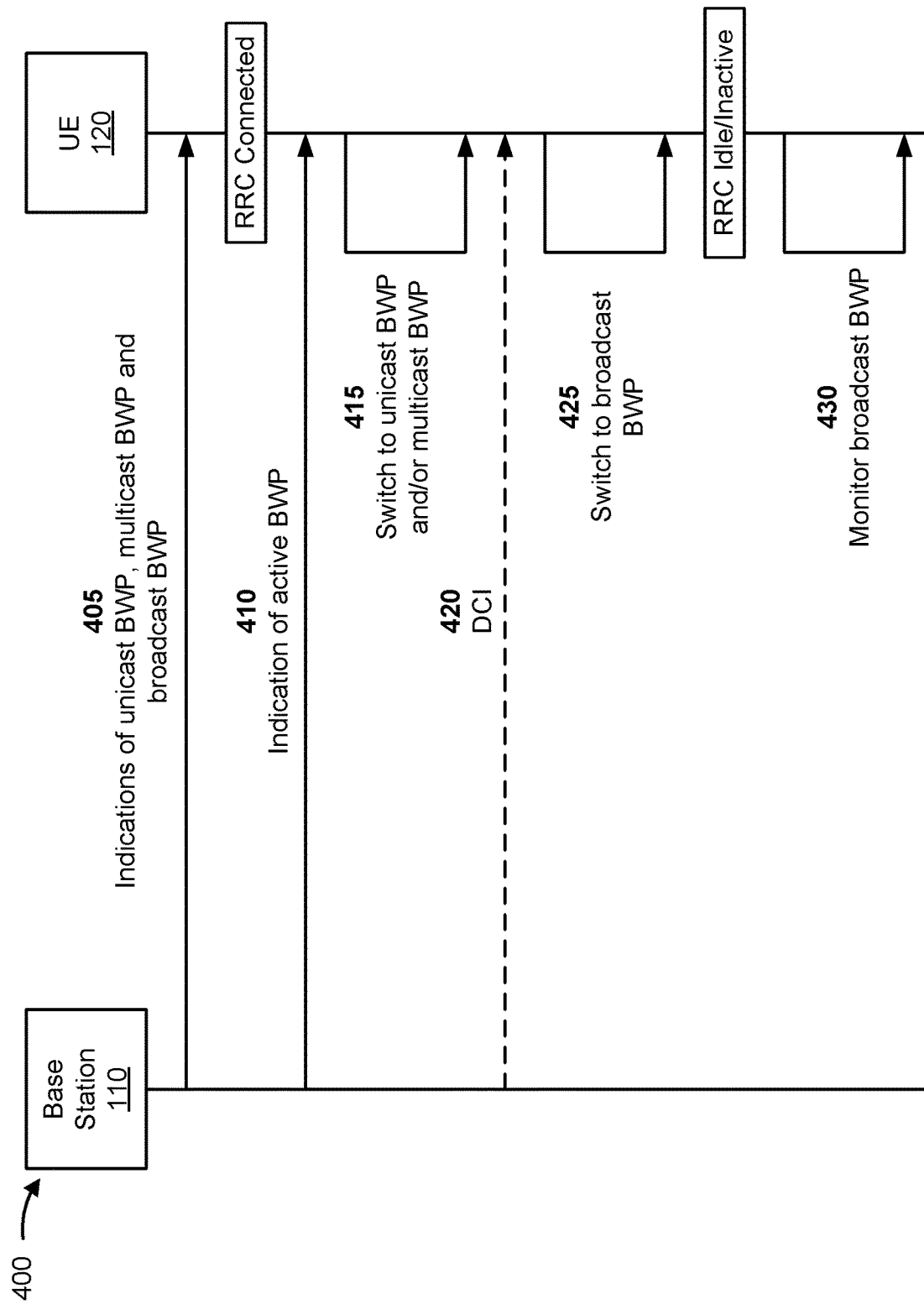
FIGS. 4-8 are diagrams illustrating examples associated with bandwidth part switching using unicast, multicast, and broadcast bandwidth parts, in accordance with the present disclosure.

FIG. 4 is a diagram illustrating an example 400 associated with bandwidth part switching using unicast, multicast, and broadcast bandwidth parts, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit, to the UE 120, indications of a unicast BWP, a multicast BWP/CFR (e.g., a multicast CFR associated with a BWP), and a broadcast BWP/CFR (e.g., a broadcast CFR associated with a BWP). In some aspects, the indication of the unicast BWP and/or the indication of the multicast BWP/CFR may be included in an RRC communication (e.g., RRC configuration), a medium access control (MAC) control element (MAC-CE), or DCI. In some aspects, the indication of the unicast BWP and the indication of the multicast BWP/CFR may be included in configuration information that identifies multiple configured BWPs for the UE 120. The unicast BWP may be an RRC dedicated BWP for downlink communications. In some aspects, the configuration information may identify multiple unicast BWPs for the UE 120 and/or multiple multicast BWPs/CFRs for the UE 120. The configuration may also identify an initial BWP and/or a default BWP for the UE 120.

In some aspects, the multicast BWP/CFR (or multiple multicast BWPs/CFRs) may be contained within the unicast BWP. For example, the unicast BWP may be wider than the multicast BWP/CFR, and the multicast BWP/CFR (e.g., multicast CFR associated with a BWP) may include a subset of PRBs included within the unicast BWP. The multicast BWP/CFR may be configured with the same subcarrier spacing (SCS), and the same cyclic prefix (CP) as that of unicast BWP. In this case, the multicast BWP/CFR may be associated with the unicast BWP and assigned a same BWP identifier as the BWP identifier associated with the unicast BWP. If there is more than one multicast BWP contained within the unicast BWP, all of the BWPs may be assigned the same BWP identifier as the unicast BWP. In some aspects, each multicast BWP/CFR associated with the unicast BWP may be configured to be associated with a respective group common radio network temporary identifier (RNTI) (e.g., group RNTI (G-RNTI)), corresponding to a respective multicast service. In some aspects, a multicast BWP/CFR associated with the unicast BWP may be configured to be associated with one or multiple G-RNTIs and one or multiple group CS-RNTIs (G-CS-RNTIs) corresponding to different multicast services. In some aspects, the multicast BWPs with the same BWP ID may be configured with different sub-BWP IDs or may be configured with new IDs defined for multicast BWPs. In some aspects, the multicast BWPs may be activated/deactivated by using an RRC communication, a MAC-CE, or DCI using the sub-BWP IDs or the new IDs for multicast BWP, separately from the dedicated unicast BWP. For example, more than one multicast BWP may be associated with a dedicated unicast BWP. The UE may receive signaling by RRC, MAC-CE or DCI to activate/deactivate a multicast BWP. The UE 120 may not monitor the deactivated multicast BWP even if it is contained within the active dedicated BWP, but may only monitor the activated multicast BWP if it is within the active dedicated BWP.

In some aspects, the multicast BWP may not be included within the unicast BWP. In this case, the UE 120 may report, to the base station 110, a UE 120 capability to have an increased number of configured BWPs. For example, the UE 120 may report a UE 120 capability of a maximum number of configured BWPs that is greater than or equal to four. The maximum number of configured BWPs for the UE 120 may correspond to a total number of BWPs including the one or more multicast BWPs, the one or more unicast BWPs, the initial BWP, and/or the default BWP. Additionally, or alternatively, since the total number of BWPs configured for the UE 120 may be limited, multiple multicast BWPs may be allocated with a shared BWP ID, which is different from the BWP ID associated with the unicast BWP. In some aspects, each multicast BWP with the shared BWP ID may be configured to be associated with a respective group common radio network temporary identifier (RNTI) (e.g., G-RNTI) and G-CS-RNTI, corresponding to a respective multicast service. In some aspects, a multicast BWP with the shared BWP ID may be configured to be associated with one or multiple G-RNTIs and one or multiple G-CS-RNTIs, corresponding to different multicast services. In some aspects, the multicast BWPs with the same BWP ID may be configured with different sub-BWP IDs or new IDs defined for multicast BWP.

In legacy NR without supporting multicast, the control resource set (CORESET) is unique among the BWPs of a serving cell. If the multicast BWP is within the dedicated BWP, it is possible to configure a CORESET shared by the multicast BWP and dedicated BWP, where UE will monitor multicast PDCCH and unicast PDCCH in the same CORESET. If the CORESET is configured within the common frequency band of multiple multicast BWPs, it is also possible to share the same CORESET for multiple multicast BWPs.

In some aspects, the multicast BWPs may be activated/deactivated by using an RRC communication, a MAC-CE, or DCI, separately from the associated BWP ID. For example, more than one multicast BWP may be associated with the same BWP ID. The UE may receive signaling by RRC, MAC-CE or DCI to activate/deactivate the multicast BWP using the sub-BWP IDs or the new IDs for multicast BWP. The UE will not monitor the deactivated multicast BWP even if it is contained within the active BWP using the associated BWP ID, but only monitor the activated multicast BWP within the active BWP. Also, it is possible to configure dormant multicast BWP, where UE will not monitor PDCCH in the dormant BWP. The state from dormant multicast BWP to/from active multicast BWP can be dynamically indicated by DL DCI, which can be GC-PDCCH for a group of UEs or unicast PDCCH per UE. The UE may report the UE capability of a maximum number of configured multicast BWPs. The UE may report the UE capability of a maximum number of dormant multicast BWPs, where the UE still carries out channel state information (CSI) measurements but no data transmission per dormant multicast BWP. The maximum number of dormant multicast BWPs may be no larger than the maximum number of configured multicast BWPs. Also, a UE may report the UE capability of a maximum number of activated multicast BWPs to be monitored at same time, which is no larger than the maximum number of dormant multicast BWPs. The number of activated multicast BWPs for a UE to monitor is no larger than the maximum number of activated multicast BWPs.

In some aspects, the indication of the broadcast BWP/CFR (e.g., the broadcast CFR associated with a BWP) may be included in an RRC communication, a MAC-CE, or DCI. For example, the indication of the broadcast BWP may be included in the configuration information that includes the indication of the unicast BWP and/or the indication of the multicast BWP. In some aspects, the configuration information may include an indication that the broadcast BWP is the same as the initial BWP. For example, the broadcast BWP/CFR may have the same size, the same frequency resources, the same subcarrier spacing (SCS), and the same cyclic prefix (CP) as the initial BWP (e.g., a type 0 CORESET (CORESET0) for RRC_IDLE/INACTIVE UEs). In some aspects, there may be no specific configuration for the broadcast BWP. In this case, the UE 120 may determine that the configuration of the initial BWP provides the indication of the broadcast BWP. In some aspects, the configuration information may provide the indication of the broadcast BWP by providing an indication of a configured BWP (e.g., a configured BWP different than the initial BWP). In this case, based at least in part on the configured BWP, the broadcast BWP (e.g., the broadcast CFR) may have a different size from the initial BWP. For example, the broadcast BWP may have a larger size than the initial BWP (e.g., with frequency resources of the initial BWP included within the broadcast BWP). For example, the broadcast BWP may have a smaller size than the initial BWP (e.g., with frequency resources of the broadcast BWP included within the initial BWP). In some aspects, the indication of the broadcast BWP may be included in a system information block (SIB) transmitted by the base station 110, such as a type 1 system information block (SIB1) or a new SIB for broadcast/multicast configuration. In this case, the broadcast BWP may be different from the initial BWP. For example, the broadcast BWP may be larger than the initial BWP or smaller than the initial BWP. In some aspects, the SIB (e.g., SIB1) may configure frequency resources for the initial BWP for UEs in RRC_CONNECTED state (i.e., SIB1-configured initial BWP), containing CORESET0 and using same SCS and CP as CORESET0. The broadcast BWP may have the same size, same frequency resources as the SIB1- configured initial BWP. In some aspects, the broadcast BWP may have the larger size, larger frequency resources than the SIB1-configured initial BWP, also larger than CORESET0. In some aspects, the broadcast BWP may have the smaller size, smaller frequency resources than the SIB1-configured initial BWP, but larger than CORESET0. In some aspects, the UE 120 may use the initial BWP as the default broadcast BWP/CFR if there is no explicit configuration of the broadcast BWP/CFR.

In some aspects, the UE 120 may select the initial BWP or the broadcast BWP/CFR configured in the SIB as the broadcast BWP/CFR for the UE 120 based at least in part on a capability or type of the UE 120. For example, if the UE 120 has a limited bandwidth capability, the UE 120 may select the initial BWP as the broadcast BWP/CFR. If the UE 120 does not have a bandwidth limitation, the UE 120 may select the broadcast BWP/CFR configured in the SIB as the broadcast BWP/CFR. In this case, the initial BWP may be included within the broadcast BWP, and the UE 120 may monitor broadcast downlink communications in the broadcast BWP and system information (SI) and paging in the initial BWP at the same time.

As further shown in FIG. 4, and by reference number 410, while the UE 120 is in an RRC connected mode, the base station 110 may transmit, to the UE 120, an indication of an active BWP. The indication of the active BWP may be a dynamic indication for the UE 120 to switch to the indicated BWP. The indication of the active BWP may be included in unicast DCI transmitted in a physical downlink control channel (PDCCH) communication from the base station 110 addressed by a UE-specific RNTI (e.g., C-RNTI or CS-RNTI).

As further shown in FIG. 4, and by reference number 415, the UE 120 may switch to the unicast BWP and/or the multicast BWP/CFR based at least in part on receiving the indication of the active BWP. The UE 120 may determine whether to switch to the unicast BWP or the multicast BWP/CFR based at least in part on the indicated active BWP. The UE 120 may monitor for unicast and/or multicast downlink communications on the active BWP (e.g., the unicast BWP or the multicast BWP). The UE 120 may also start a timer that triggers the UE 120 to switch from the active BWP (e.g., the unicast BWP associated with the multicast BWP/CFR) to the default BWP (e.g., configured as initial BWP or the broadcast BWP/CFR).

The UE 120 may switch to the unicast BWP based at least in part on an indication that the active BWP is the unicast BWP. In a case in which the multicast BWP is not included within the unicast BWP, the UE 120 may then monitor for unicast downlink communications in the unicast BWP until the timer expires. In a case in which the multicast BWP is included within the unicast BWP, the UE 120 may then monitor for unicast downlink communications in the unicast BWP and monitor for multicast downlink communications in the multicast BWP until the timer expires. If the broadcast BWP is included within the unicast BWP, the UE 120 may also monitor for broadcast downlink communications.

The UE 120 may switch to the multicast BWP based at least in part on an indication that the active BWP is the multicast BWP. In this case, the UE 120 may then monitor for multicast downlink communications in the multicast BWP until the timer expires. If the broadcast BWP is included within the multicast BWP, the UE 120 may also monitor for broadcast downlink communications.

As further shown in FIG. 4, and by reference number 420, the base station 110 may transmit, to the UE 120, DCI in the active BWP (e.g., the unicast BWP or the multicast BWP). For example, the UE 120 may receive a PDCCH communication including DCI addressed by a UE-specific RNTI (e.g., cell RNTI (C-RNTI), modulation coding scheme C-RNTI (MCS-C-RNTI), or configured scheduling RNTI (CS-RNTI)) to schedule a unicast PDSCH in the unicast BWP. Additionally, or alternatively, the UE 120 may receive a PDCCH communication including DCI addressed by a group RNTI (e.g., G-RNTI or group configured scheduling RNTI (G-CS-RNTI)) to schedule a multicast PDSCH communication in the multicast BWP associated with the unicast active BWP. The UE 120 may start a timer or restart the timer when the UE 120 decodes the DCI with the unicast RNTI and/or the DCI with the group RNTI on or to the multicast CFR associated with the unicast active BWP. The UE 120 may then receive the scheduled unicast PDSCH communication in the unicast active BWP and/or receive the scheduled multicast PDSCH communication in the multicast BWP associated with the unicast active BWP.

As further shown in FIG. 4, and by reference number 425, the UE 120 may switch to the broadcast BWP based at least in part on the timer expiring. The default BWP for the UE 120 may be configured to be the broadcast BWP. Accordingly, the UE 120 may switch to the broadcast BWP when the timer associated with the active BWP expires. The UE 120 may then monitor for broadcast downlink communications on the broadcast BWP. The base station 110 may transmit one or more broadcast communications to the UE 120 in the broadcast BWP. The broadcast BWP may be smaller than the unicast BWP. Accordingly, the UE 120 may conserve power while still monitoring for broadcast downlink communications.

As further shown in FIG. 4, and by reference number 430, while the UE 120 is in an RRC idle mode or an RRC inactive mode, the UE 120 may monitor for broadcast communications on the broadcast BWP. The UE 120 may monitor the broadcast BWP without performing BWP switching while in the RRC idle mode or RRC inactive mode. For example, the UE 120 may monitor the broadcast BWP for broadcast communications at least until the UE 120 returns to the RRC connected mode. The base station 110 may transmit, and the UE 120 may receive, broadcast downlink communications, such as public safety information, in the broadcast BWP while the UE 120 is in the RRC idle mode or the RRC inactive mode. In some case, after the UE 120 returns to the RRC connected mode, the base station 110 may transmit multicast and broadcast services in a configured multicast CFR associated with the unicast BWP. In some case, after the UE 120 returns to the RRC connected mode, the base station 110 may transmit multicast and broadcast services in different configured multicast CFRs associated with same or different unicast BWP.

As described above in connection with FIG. 4, the UE 120 may receive an indication of a multicast BWP/CFR and an indication of a broadcast BWP/CFR. The UE may determine whether to switch a bandwidth part for receiving downlink communications based at least in part on the multicast BWP/CFR and the broadcast BWP/CFR. As a result, the UE may support BWP switching for unicast, multicast, and broadcast downlink communications. Therefore, power consumption associated with the UE monitoring and receiving unicast, multicast, and broadcast downlink communications may be reduced.

As indicated above, FIG. 4 is provided as an example. Other examples may differ from what is described with respect to FIG. 4.

Figure 5:
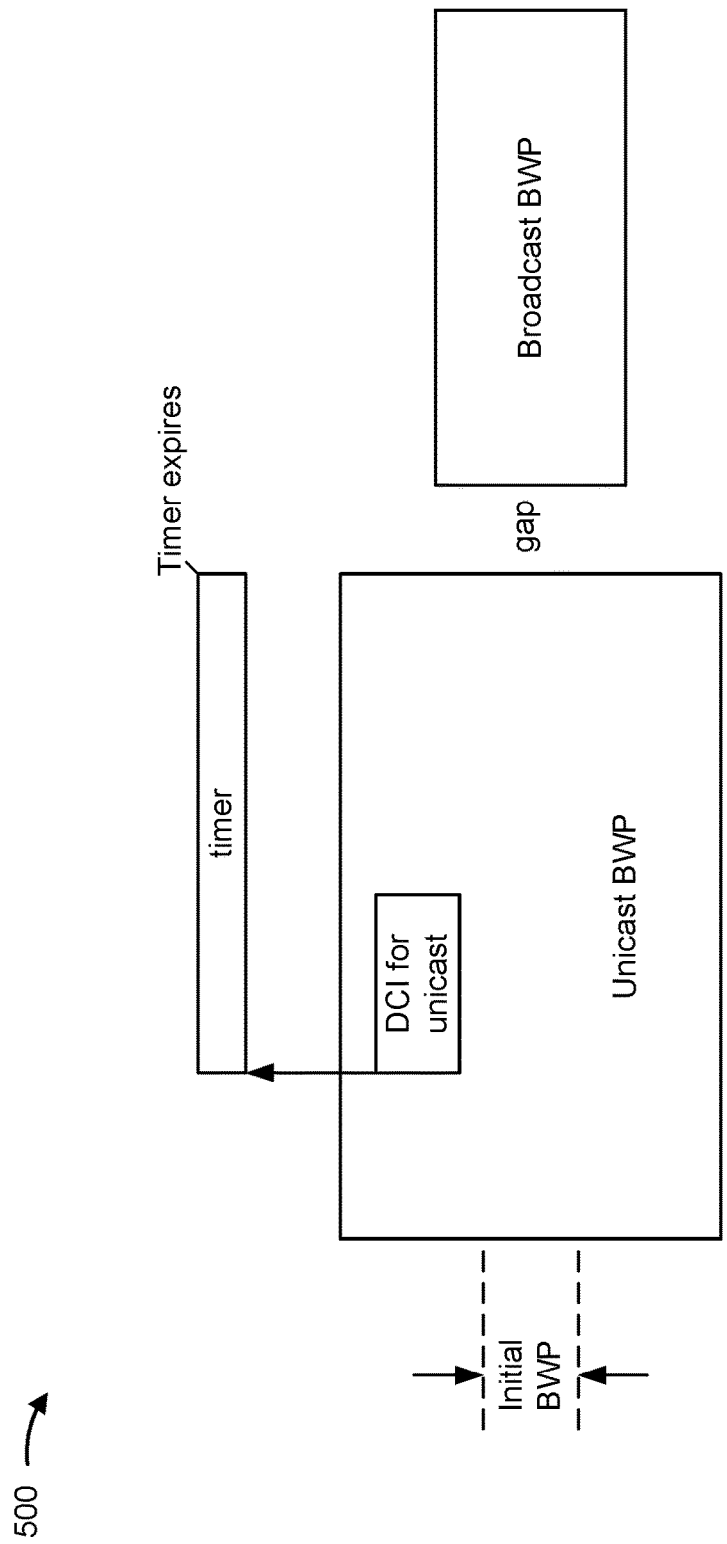

FIG. 5 is a diagram illustrating an example 500 associated with BWP switching using unicast, multicast, and broadcast BWP, in accordance with the present disclosure. As shown in FIG. 5, example 500 shows BWP switching by a UE (e.g., UE 120) based at least in part on an indication of an active BWP.

As shown in FIG. 5, the UE may initially monitor an initial BWP configured for the UE. The UE may receive an indication of an active BWP. The indication of the active BWP may indicate that the active BWP is the unicast BWP. The UE may switch to monitoring the unicast BWP and start the timer based at least in part on receiving the indication of the active BWP. In example 500, the multicast BWP/CFR is not included within the unicast BWP. Accordingly, the UE may monitor for unicast downlink communications in the unicast BWP and may monitor for broadcast downlink communications in the broadcast BWP (which is included within the unicast BWP).

As further shown in FIG. 5, the UE may receive and decode DCI with a unicast RNTI (e.g., C-RNTI, MCS-C-RNTI, or SPS-C-RNTI) that schedules a unicast PDSCH communication in the unicast BWP. The UE may reset the timer based at least in part on decoding the DCI. When the timer expires, the UE may switch to monitoring the broadcast BWP. As described above, the default BWP for the UE may be the broadcast BWP. In some aspects, the UE may switch to the broadcast BWP and begin monitoring the broadcast BWP after a time gap after the expiration of the timer. The time gap may be based at least in part on a capability of the UE. For example, the time gap may be configured to allow the UE time to perform radio frequency tuning to switch the BWP.

As indicated above, FIG. 5 is provided as an example. Other examples may differ from what is described with respect to FIG. 5.

Figure 6:
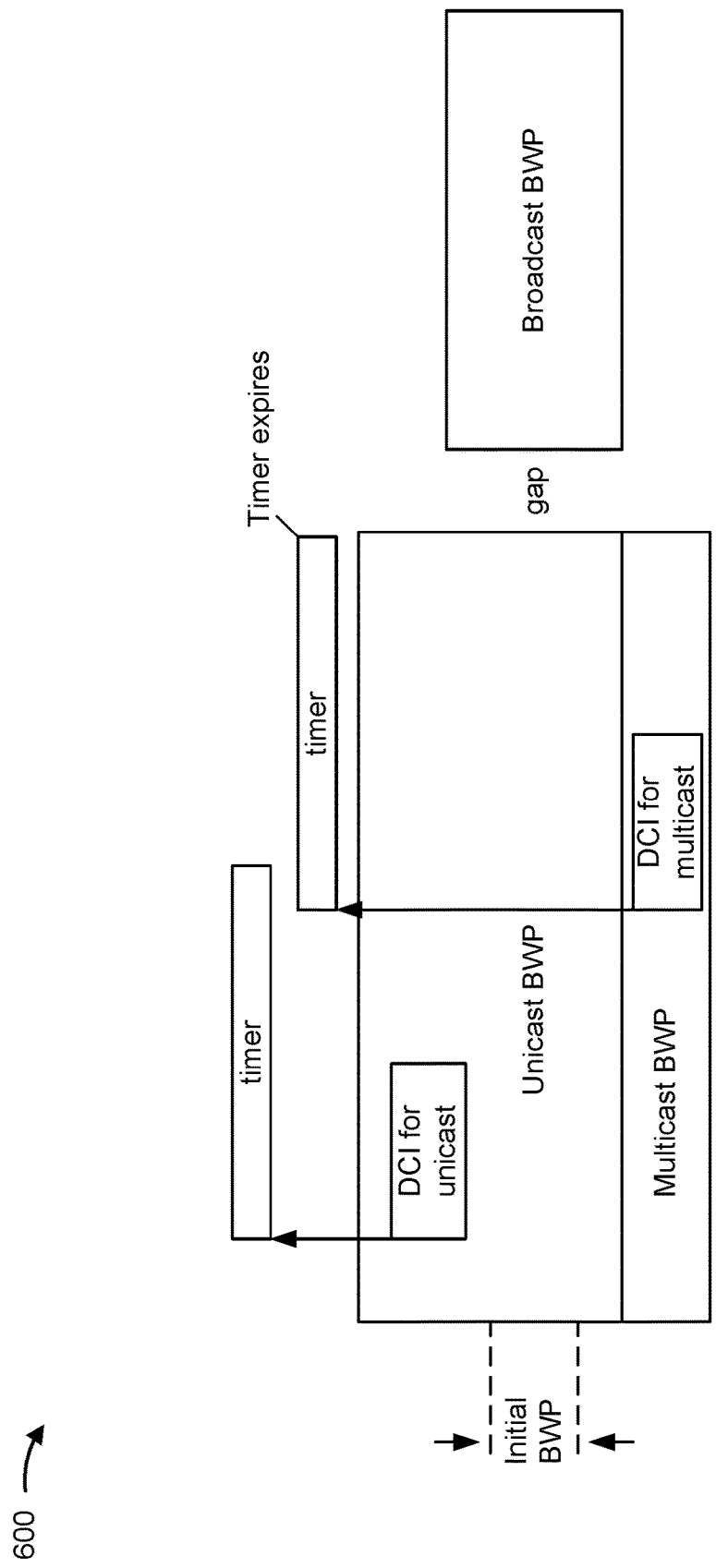

FIG. 6 is a diagram illustrating an example 600 associated with BWP switching using unicast, multicast, and broadcast BWPs, in accordance with the present disclosure. As shown in FIG. 6, example 600 shows BWP switching by a UE (e.g., UE 120) based at least in part on an indication of an active BWP.

As shown in FIG. 6, the UE may initially monitor the initial BWP configured for the UE. The UE may receive an indication of an active BWP. The indication of the active BWP may indicate that the active BWP is the unicast BWP. The UE may switch to monitoring the unicast BWP and start the timer based at least in part on receiving the indication of the active BWP. In example 600, the multicast BWP/CFR is included within the unicast BWP. Accordingly, the UE may monitor for unicast downlink communications in the unicast BWP, may monitor for multicast downlink communications in the multicast BWP/CFR, and may monitor for broadcast downlink communications in the broadcast BWP (which is also included within the unicast BWP).

As further shown in FIG. 6, the UE may receive and decode DCI with a unicast RNTI (e.g., C-RNTI, MCS-C-RNTI, or SPS-C-RNTI) that schedules a unicast PDSCH communication in the unicast BWP. The UE may reset the timer based at least in part on decoding the DCI with the unicast RNTI. The UE may also receive and decode DCI with a group RNTI (e.g., G-RNTI or CS-G-RNTI) that schedules a multicast PDSCH communication in the multicast BWP/CFR that is within the active unicast BWP. The UE may reset the timer based at least in part on decoding the DCI with the group RNTI. When the timer expires, the UE may switch to monitoring the broadcast BWP. As described above, the default BWP for the UE may be the broadcast BWP.

As indicated above, FIG. 6 is provided as an example. Other examples may differ from what is described with respect to FIG. 6.

Figure 7:
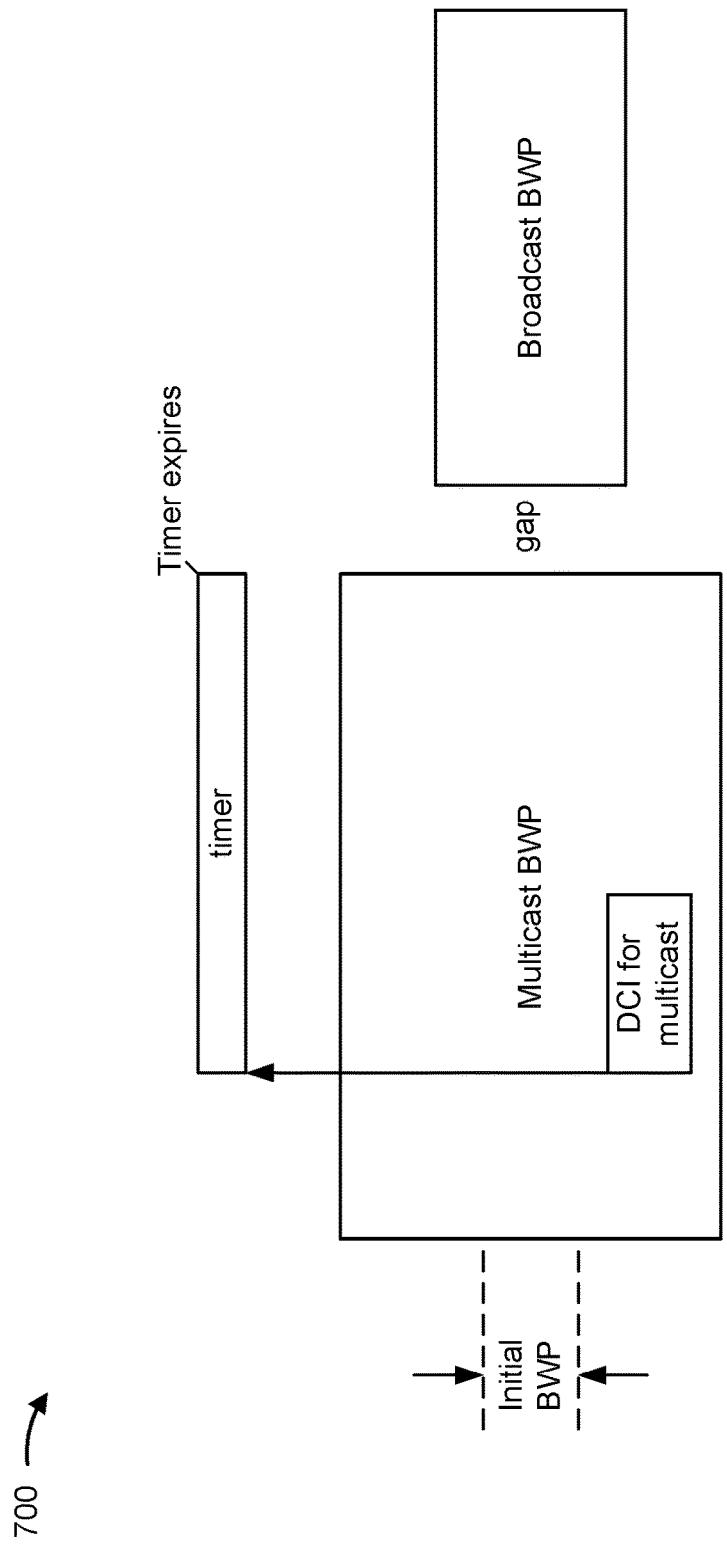

FIG. 7 is a diagram illustrating an example 700 associated with BWP switching using unicast, multicast, and broadcast BWPs, in accordance with the present disclosure. As shown in FIG. 7, example 700 shows BWP switching by a UE (e.g., UE 120) based at least in part on an indication of an active BWP.

As shown in FIG. 7, the UE may initially monitor the initial BWP configured for the UE. The UE may receive an indication of an active BWP. The indication of the active BWP may indicate that the active BWP is the multicast BWP/CFR. In example 700, the multicast BWP/CFR is not associated with or included within the unicast BWP. The UE may switch to monitoring the multicast BWP/CFR and start the timer based at least in part on receiving the indication of the active BWP. Accordingly, the UE may monitor for multicast downlink communications in the multicast BWP/CFR and may monitor for broadcast downlink communications in the broadcast BWP (which is included within the multicast BWP/CFR).

As further shown in FIG. 7, the UE may receive and decode DCI with a group RNTI (e.g., G-RNTI or CS-G-RNTI) that schedules a multicast PDSCH communication in the multicast BWP/CFR that is within the active unicast BWP. The UE may reset the timer based at least in part on decoding the DCI with the group RNTI. When the timer expires, the UE may switch to monitoring the broadcast BWP. As described above, the default BWP for the UE may be the broadcast BWP. In some case, the default BWP for the UE may be configured as a dedicated BWP for unicast PDSCH. The dedicated BWP may include the broadcast BWP and initial BWP so that the UE can monitor unicast and broadcast PDSCH.

As indicated above, FIG. 7 is provided as an example. Other examples may differ from what is described with respect to FIG. 7.

Figure 8:
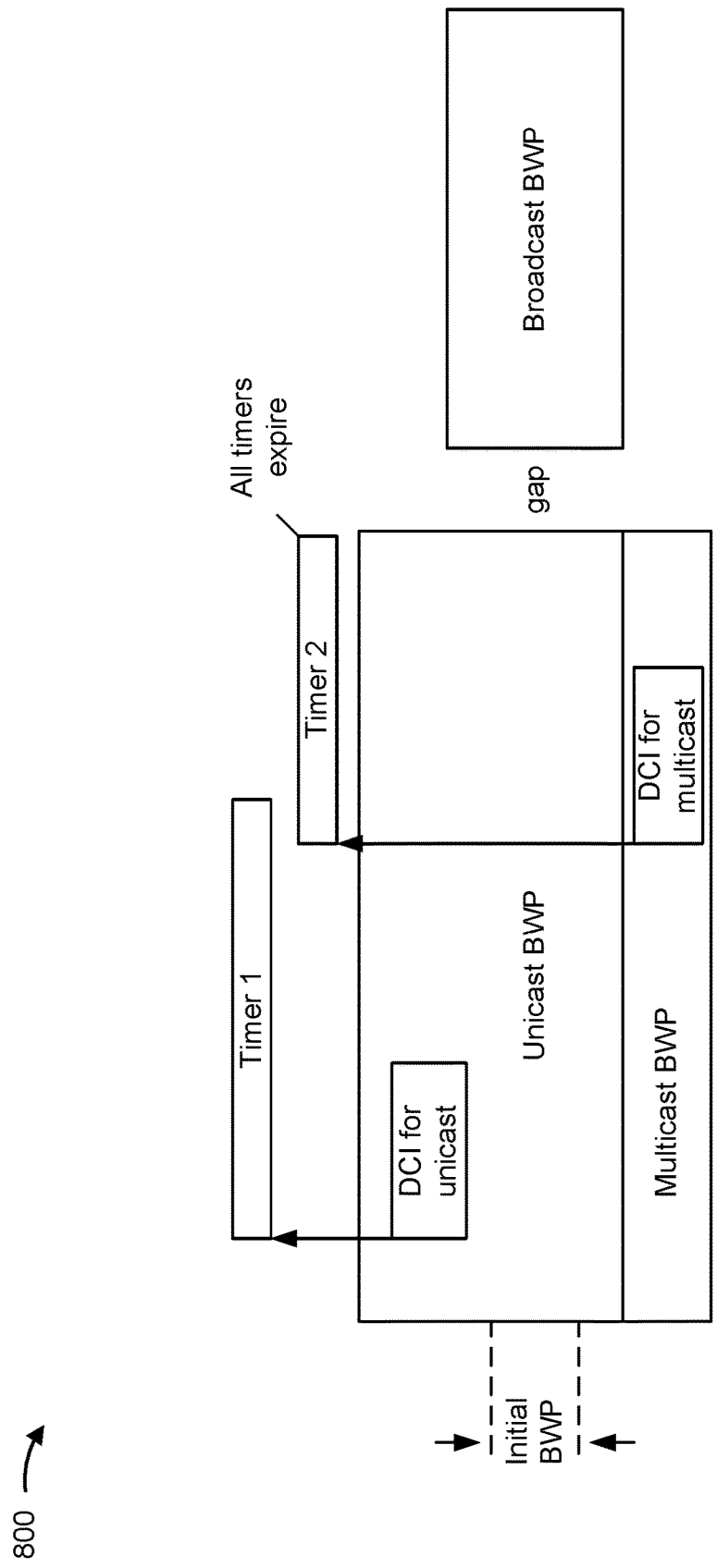

FIG. 8 is a diagram illustrating an example 800 associated with BWP switching using unicast, multicast, and broadcast BWPs, in accordance with the present disclosure. As shown in FIG. 8, example 800 shows BWP switching by a UE (e.g., UE 120) based at least in part on an indication of an active BWP and based at least in part on first and second timers associated with unicast and multicast BWPs/CFRs, respectively.

As shown in FIG. 8, the UE may initially monitor the initial BWP configured for the UE. The UE may receive an indication of an active BWP. The indication of the active BWP may indicate that the active BWP is the unicast BWP. The UE may switch to monitoring the unicast BWP based at least in part on receiving the indication of the active BWP. In example 800, the multicast BWP/CFR is included within the unicast BWP. Accordingly, the UE may monitor for unicast downlink communications in the unicast BWP, may monitor for multicast downlink communications in the multicast BWP/CFR, and may monitor for broadcast downlink communications in the broadcast BWP (which is also included within the unicast BWP). In some aspects, the UE may start the first timer ("timer 1") associated with monitoring the unicast BWP and a second timer ("timer 2") associated with monitoring the multicast BWP/CFR based at least in part on switching to the active BWP. Timer 1 and timer 2 may be configured with the same or different durations.

As further shown in FIG. 8, the UE may receive and decode DCI with a unicast RNTI (e.g., C-RNTI, MCS-C-

RNTI, or SPS-C-RNTI) that schedules a unicast PDSCH communication in the unicast BWP. The UE may reset timer 1 based at least in part on decoding the DCI with the unicast RNTI. The UE may also receive and decode DCI with a group RNTI (e.g., G-RNTI or CS-G-RNTI) that schedules a multicast PDSCH communication in the multicast BWP/CFR that is within the active unicast BWP. The UE may reset timer 2 based at least in part on decoding the DCI with the group RNTI. When both timer 1 and timer 2 expire, the UE may switch to monitoring the broadcast BWP/CFR. As described above, the default BWP for the UE may be the broadcast BWP/CFR.

In some aspects, when the UE is monitoring both the unicast BWP and the multicast BWP/CFR, as shown in FIG. 8, the UE may receive a unicast DCI that provides an indication of dynamic BWP switching during the reception of a multicast downlink communication and/or a unicast downlink communication in the active BWP. In some aspects, the UE may ignore the dynamic BWP switching indication until the reception of all of the multicast and/or unicast downlink communications in the active BWP is complete. In some aspects, the UE may determine whether to perform the dynamic BWP switching based on a priority indicated by the DCI. For example, if the priority indicated by the DCI that includes the dynamic switching indication is lower or the same as a priority associated with a multicast or unicast downlink communication to be received in the active BWP, the UE may wait until the reception of the multicast or unicast downlink communication is complete or the active time expires before performing the BWP switching. If the priority indicated by the DCI is higher than the priority associated with the multicast or unicast downlink communication to be received in the active BWP, the UE may perform the BWP switching immediately.

As indicated above, FIG. 8 is provided as an example. Other examples may differ from what is described with respect to FIG. 8.

Figure 9:
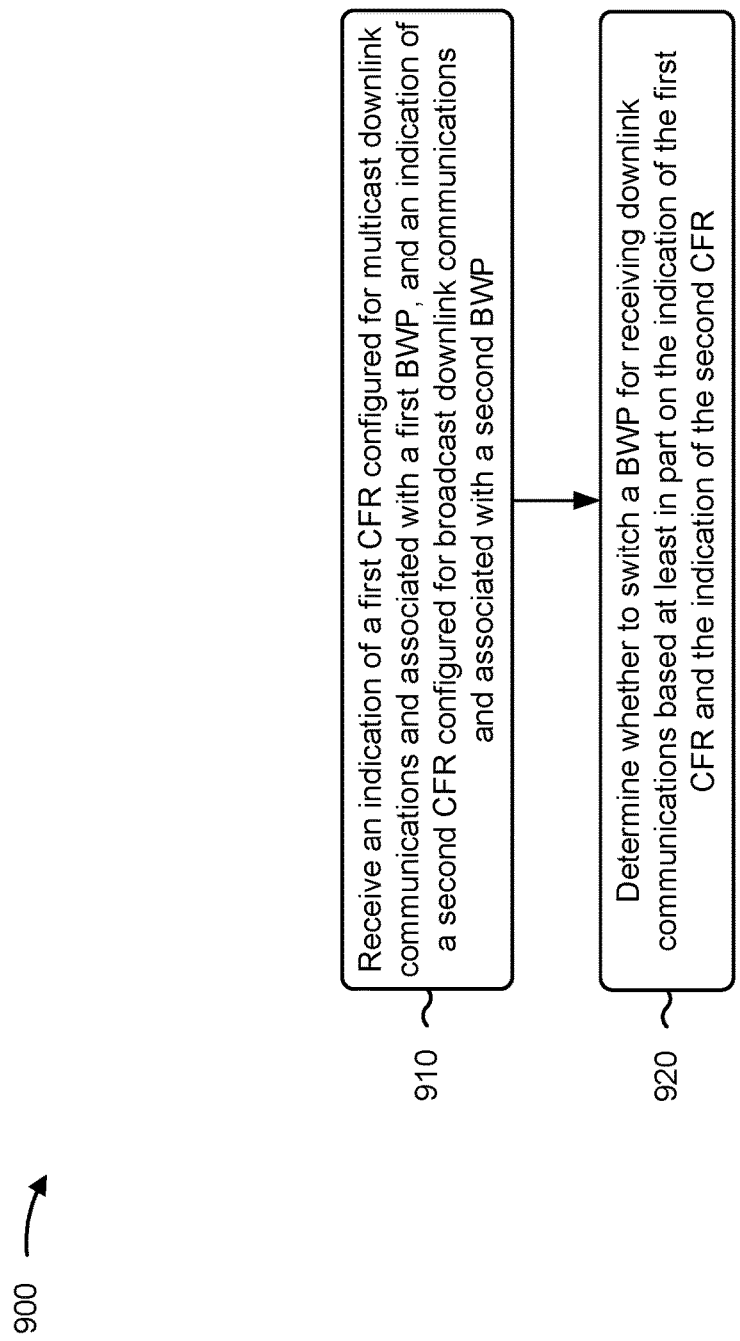
FIGS. 9-10 are diagrams illustrating example processes associated with bandwidth part switching using unicast, multicast, and broadcast bandwidth parts, in accordance with the present disclosure.

FIG. 9 is a diagram illustrating an example process 900 performed, for example, by a UE, in accordance with the present disclosure. Example process 900 is an example where the UE (e.g., UE 120) performs operations associated with BWP switching using unicast, multicast, and broadcast BWPs.

As shown in FIG. 9, in some aspects, process 900 may include receiving an indication of a first CFR configured for multicast downlink communications and associated with a first BWP, and an indication of a second CFR configured for broadcast downlink communications and associated with a second BWP (block 910). For example, the UE (e.g., using reception component 1102, depicted in FIG. 11) may receive an indication of a first CFR configured for multicast downlink communications and associated with a first BWP, and an indication of a second CFR configured for broadcast downlink communications and associated with a second BWP, as described above.

As further shown in FIG. 9, in some aspects, process 900 may include determining whether to switch a BWP for receiving downlink communications based at least in part on the indication of the first CFR and the indication of the second CFR (block 920). For example, the UE (e.g., using determination component 1108, depicted in FIG. 11) may determine whether to switch a BWP for receiving downlink communications based at least in part on the indication of the first CFR and the indication of the second CFR, as described above.

Process 900 may include additional aspects, such as any single aspect or any combination of aspects described below and/or in connection with one or more other processes described elsewhere herein.

In a first aspect, the indication of the first CFR is included in at least one of a radio resource control communication, a medium access control (MAC) control element, or downlink control information.

In a second aspect, alone or in combination with the first aspect, the indication of the first CFR is included in configuration information identifying an initial BWP, the first CFR configured for multicast downlink communications, and a unicast BWP configured for unicast downlink communications.

In a third aspect, alone or in combination with one or more of the first and second aspects, the first CFR is included within the unicast BWP, and the first CFR is associated with a same BWP identifier as the unicast BWP.

In a fourth aspect, alone or in combination with one or more of the first through third aspects, the first CFR is one of multiple CFRs associated with multicast downlink communications identified in the configuration information, and the multiple CFRs are associated with a same BWP identifier.

In a fifth aspect, alone or in combination with one or more of the first through fourth aspects, each of the multiple CFRs is associated with a respective sub-BWP identifier.

In a sixth aspect, alone or in combination with one or more of the first through fourth aspects, each of the multiple CFRs is associated with a respective radio network temporary identifier.

In a seventh aspect, alone or in combination with one or more of the first through sixth aspects, the indication of the second CFR is included in the configuration information.

In an eighth aspect, alone or in combination with one or more of the first through seventh aspects, the initial BWP identified in the configuration information is the second CFR configured for broadcast downlink communications.

In a ninth aspect, alone or in combination with one or more of the first through sixth aspects, the indication of the second CFR is included in a system information block.

In a tenth aspect, alone or in combination with the ninth aspect, the second CFR is different than at least one of a CORESET0 or an initial BWP configured in the system information block.

In an eleventh aspect, alone or in combination with one or more of the first through tenth aspects, the indication of the second CFR includes an indication of a first-type broadcast CFR that is the same as an initial BWP and an indication of a second-type broadcast CFR that is different than the initial BWP, further comprising selecting the first-type broadcast CFR or the second-type broadcast CFR as the second CFR configured for broadcast downlink communications based at least in part on a capability or type of the UE.

In a twelfth aspect, alone or in combination with one or more of the first through eleventh aspects, determining whether to switch the BWP for receiving downlink communications comprises switching to the first BWP associated with the first CFR to receive one or more multicast downlink communications.

In a thirteenth aspect, alone or in combination with one or more of the first through twelfth aspects, determining whether to switch the BWP for receiving downlink communications comprises switching to the second BWP associated with the second CFR to receive one or more broadcast downlink communications.

In a fourteenth aspect, alone or in combination with one or more of the first through thirteenth aspects, process 900 includes receiving an indication of an active BWP, wherein determining whether to switch the BWP for receiving downlink communications comprises switching from an initial BWP to at least one of the first BWP associated with the first CFR configured for multicast downlink communications or a unicast BWP configured for unicast downlink communications based at least in part on the indication of the active BWP, and switching from the at least one of the first BWP associated with the first CFR or the unicast BWP to the second BWP associated with the second CFR based at least in part on expiration of a timer.

In a fifteenth aspect, alone or in combination with one or more of the first through fourteenth aspects, switching from the initial BWP to the at least one of the first BWP associated with the first CFR or the unicast BWP comprises switching to the first BWP associated with the first CFR.

In a sixteenth aspect, alone or in combination with one or more of the first through fifteenth aspects, process 900 includes receiving, in the first CFR, downlink control information scheduling a multicast downlink communication, the downlink control information is associated with a group radio network temporary identifier, and setting or resetting the timer based at least in part on decoding the downlink control information associated with the group radio network temporary identifier.

In a seventeenth aspect, alone or in combination with one or more of the first through sixteenth aspects, process 900 includes receiving, in the first CFR, the multicast downlink communication scheduled by the downlink control information.

In an eighteenth aspect, alone or in combination with one or more of the first through seventeenth aspects, the second CFR is included within the first CFR, further comprising receiving at least one of a multicast downlink communication in the first CFR or a broadcast downlink communication in the second CFR.

In a nineteenth aspect, alone or in combination with one or more of the first through eighteenth aspects, switching from the initial BWP to the at least one of the first BWP associated with the first CFR or the unicast BWP comprises switching to the unicast BWP, wherein the first CFR is included within the unicast BWP.

In a twentieth aspect, alone or in combination with one or more of the first through nineteenth aspects, process 900 includes receiving at least one of downlink control information associated with a unicast radio network temporary identifier in the unicast BWP or downlink control information associated with a group radio network temporary identifier in the first CFR, and resetting the timer based at least in part on decoding the downlink control information associated with the unicast radio network temporary identifier or decoding the downlink control information associated with the group radio network temporary identifier.

In a twenty-first aspect, alone or in combination with one or more of the first through twentieth aspects, switching from the unicast BWP to the second BWP associated with the second CFR is based at least in part on expiration of a first timer associated with the first CFR and a second timer associated with the unicast BWP.

In a twenty-second aspect, alone or in combination with one or more of the first through twenty-first aspects, process 900 includes receiving, in the first CFR, downlink control information associated with a group radio network temporary identifier, and resetting the first timer based at least in part on decoding the downlink control information associated with the group radio network temporary identifier.

In a twenty-third aspect, alone or in combination with one or more of the first through twenty-second aspects, process 900 includes receiving, in the unicast BWP, downlink control information associated with a unicast radio network temporary identifier, and resetting the second timer based at least in part on decoding the downlink control information associated with the unicast radio network temporary identifier.

In a twenty-fourth aspect, alone or in combination with one or more of the first through twenty-third aspects, process 900 includes receiving, in the first CFR, a multicast downlink communication, receiving, in the unicast BWP, unicast downlink control information indicating dynamic bandwidth switching, and determining whether to perform the dynamic bandwidth switching based at least in part on a priority associated with a unicast communication scheduled by the unicast downlink control information and a priority associated with the multicast downlink communication.

In a twenty-fifth aspect, alone or in combination with one or more of the first through twenty-fourth aspects, a default BWP for the UE is configured as the second CFR configured for broadcast downlink communications.

In a twenty-sixth aspect, alone or in combination with one or more of the first through twenty-fifth aspects, process 900 includes receiving, in the second CFR while in a radio resource control idle mode or a radio resource control inactive mode, a broadcast downlink communication.

In a twenty-seventh aspect, alone or in combination with one or more of the first through twenty-sixth aspects, process 900 includes transmitting, to a base station, an indication of a maximum number of configured multicast CFRs for the UE.

In a twenty-eighth aspect, alone or in combination with one or more of the first through twenty-seventh aspects, process 900 includes transmitting, to the base station, an indication of a maximum number of dormant multicast CFRs for the UE.

In a twenty-ninth aspect, alone or in combination with one or more of the first through twenty-eighth aspects, process 900 includes transmitting, to the base station, an indication of a maximum number of activated multicast CFRs to be monitored simultaneously by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
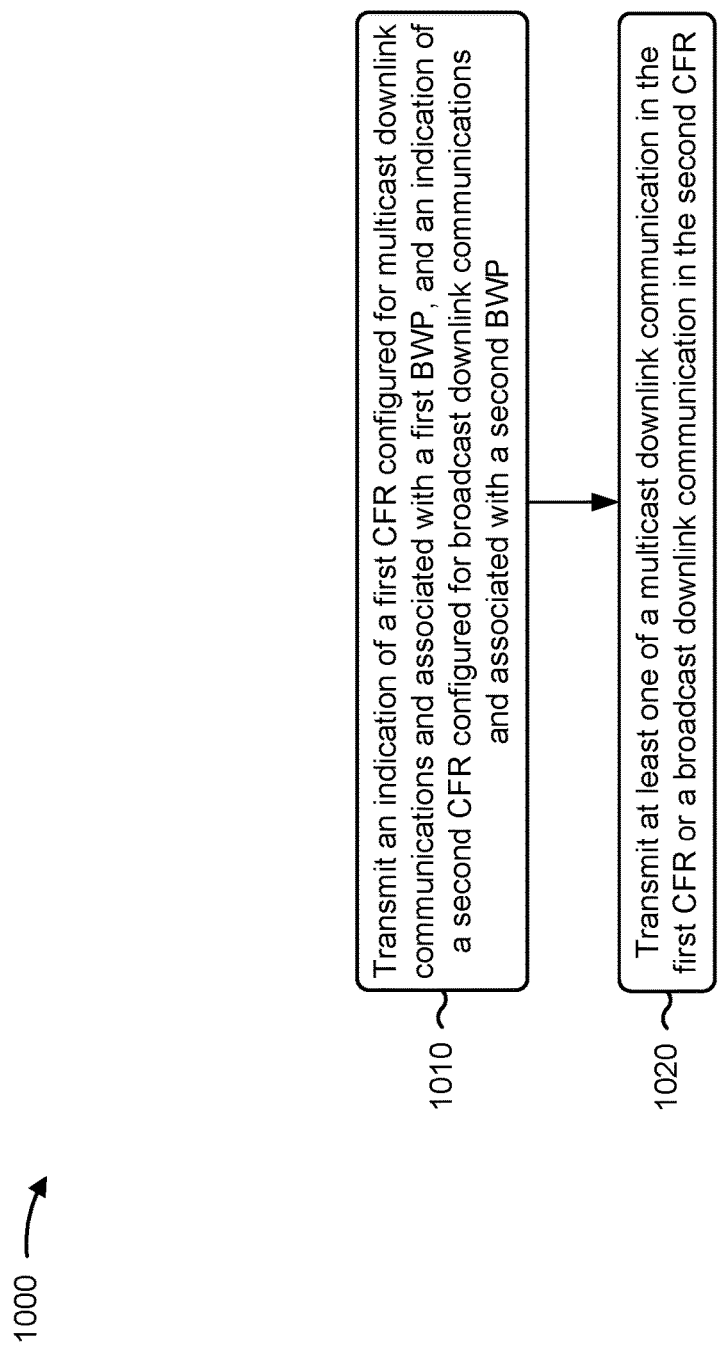

FIG. 10 is a diagram illustrating an example process 1000 performed, for example, by a base station, in accordance with the present disclosure. Example process 1000 is an example where the base station (e.g., base station 110) performs operations associated with BWP switching using unicast, multicast, and broadcast BWPs.

As shown in FIG. 10, in some aspects, process 1000 may include transmitting, to a UE, an indication of a first CFR configured for multicast downlink communications and associated with a first BWP, and an indication of a second CFR configured for broadcast downlink communications and associated with a second BWP (block 1010). For example, the base station (e.g., using transmission component 1204, depicted in FIG. 12) may transmit, to a UE, an indication of a first CFR configured for multicast downlink communications and associated with a first BWP, and an indication of a second CFR configured for broadcast downlink communications and associated with a second BWP, as described above.

As further shown in FIG. 10, in some aspects, process 1000 may include transmitting, to the UE, at least one of a multicast downlink communication in the first CFR or a broadcast downlink communication in the second CFR (block 1020). For example, the base station (e.g., using transmission component 1204, depicted in FIG. 12) may transmit, to the UE, at least one of a multicast downlink communication in the first CFR or a broadcast downlink communication in the second CFR, as described above.

Process 1000 may include additional aspects, such as any single aspect or any combination of aspects described below and/or in connection with one or more other processes described elsewhere herein.

In a first aspect, the indication of the first CFR is included in at least one of a radio resource control communication, a medium access control (MAC) control element, or downlink control information.

In a second aspect, alone or in combination with the first aspect, the indication of the first CFR is included in configuration information identifying an initial BWP, the first CFR configured for multicast downlink communications, and a unicast BWP configured for unicast downlink communications.

In a third aspect, alone or in combination with one or more of the first and second aspects, the first CFR is included within the unicast BWP, and the first CFR is associated with a same BWP identifier as the unicast BWP.

In a fourth aspect, alone or in combination with one or more of the first through third aspects, the first CFR is one of multiple CFRs associated with multicast downlink communications identified in the configuration information, and the multiple CFRs are associated with a same BWP identifier.

In a fifth aspect, alone or in combination with one or more of the first through fourth aspects, each of the multiple CFRs is associated with a respective sub-BWP identifier.

In a sixth aspect, alone or in combination with one or more of the first through fourth aspects, each of the multiple CFRs is associated with a respective radio network temporary identifier.

In a seventh aspect, alone or in combination with one or more of the first through sixth aspects, the indication of the second CFR is included in the configuration information.

In an eighth aspect, alone or in combination with one or more of the first through seventh aspects, the initial BWP identified in the configuration information is the second CFR associated with broadcast downlink communications.

In a ninth aspect, alone or in combination with one or more of the first through sixth aspects, the indication of the second CFR is included in a system information block.

In a tenth aspect, alone or in combination with the ninth aspect, the second CFR is different than a CORESET0 or an initial BWP configured in the system information block.

In an eleventh aspect, alone or in combination with one or more of the first through tenth aspects, transmitting the at least one of the multicast downlink communication in the first CFR or the broadcast downlink communication in the second CFR comprises transmitting one or more multicast downlink communications in the first CFR.

In a twelfth aspect, alone or in combination with one or more of the first through eleventh aspects, transmitting the at least one of the multicast downlink communication in the first CFR or the broadcast downlink communication in the second CFR comprises transmitting one or more broadcast downlink communications in the second CFR.

In a thirteenth aspect, alone or in combination with one or more of the first through twelfth aspects, process 1000 includes transmitting, to the UE, an indication of an active BWP, wherein the active BWP is the first BWP associated with the first CFR configured for multicast downlink communications or a unicast BWP configured for unicast downlink communications.

In a fourteenth aspect, alone or in combination with one or more of the first through thirteenth aspects, the active BWP is the first CFR.

In a fifteenth aspect, alone or in combination with one or more of the first through fourteenth aspects, process 1000 includes transmitting, to the UE in the first CFR, downlink control information scheduling a multicast downlink communication, wherein the downlink control information is associated with a group radio network temporary identifier, and transmitting, to the UE in the first CFR, the multicast downlink communication scheduled by the downlink control information.

In a sixteenth aspect, alone or in combination with one or more of the first through fifteenth aspects, the active BWP is the unicast BWP, and the first CFR is included within the unicast BWP.

In a seventeenth aspect, alone or in combination with one or more of the first through sixteenth aspects, process 1000 includes transmitting, to the UE, at least one of downlink control information associated with a unicast radio network temporary identifier on the unicast BWP or downlink control information associated with a group radio network temporary identifier on the first CFR.

In an eighteenth aspect, alone or in combination with one or more of the first through seventeenth aspects, a default BWP for the UE is configured as the second CFR configured for broadcast downlink communications.

In a nineteenth aspect, alone or in combination with one or more of the first through eighteenth aspects, process 1000 includes transmitting a broadcast downlink communication to the UE in the second CFR while the UE is in a radio resource control idle mode or a radio resource control inactive mode.

In a twentieth aspect, alone or in combination with one or more of the first through nineteenth aspects, process 900 includes receiving, from the UE, an indication of a maximum number of configured multicast CFRs for the UE.

In a twenty-first aspect, alone or in combination with one or more of the first through twentieth aspects, process 900 includes receiving, from the UE, an indication of a maximum number of dormant multicast CFRs for the UE.

In a twenty-second aspect, alone or in combination with one or more of the first through twenty-first aspects, process 900 includes receiving, from the UE, an indication of a maximum number of activated multicast CFRs to be monitored simultaneously by the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
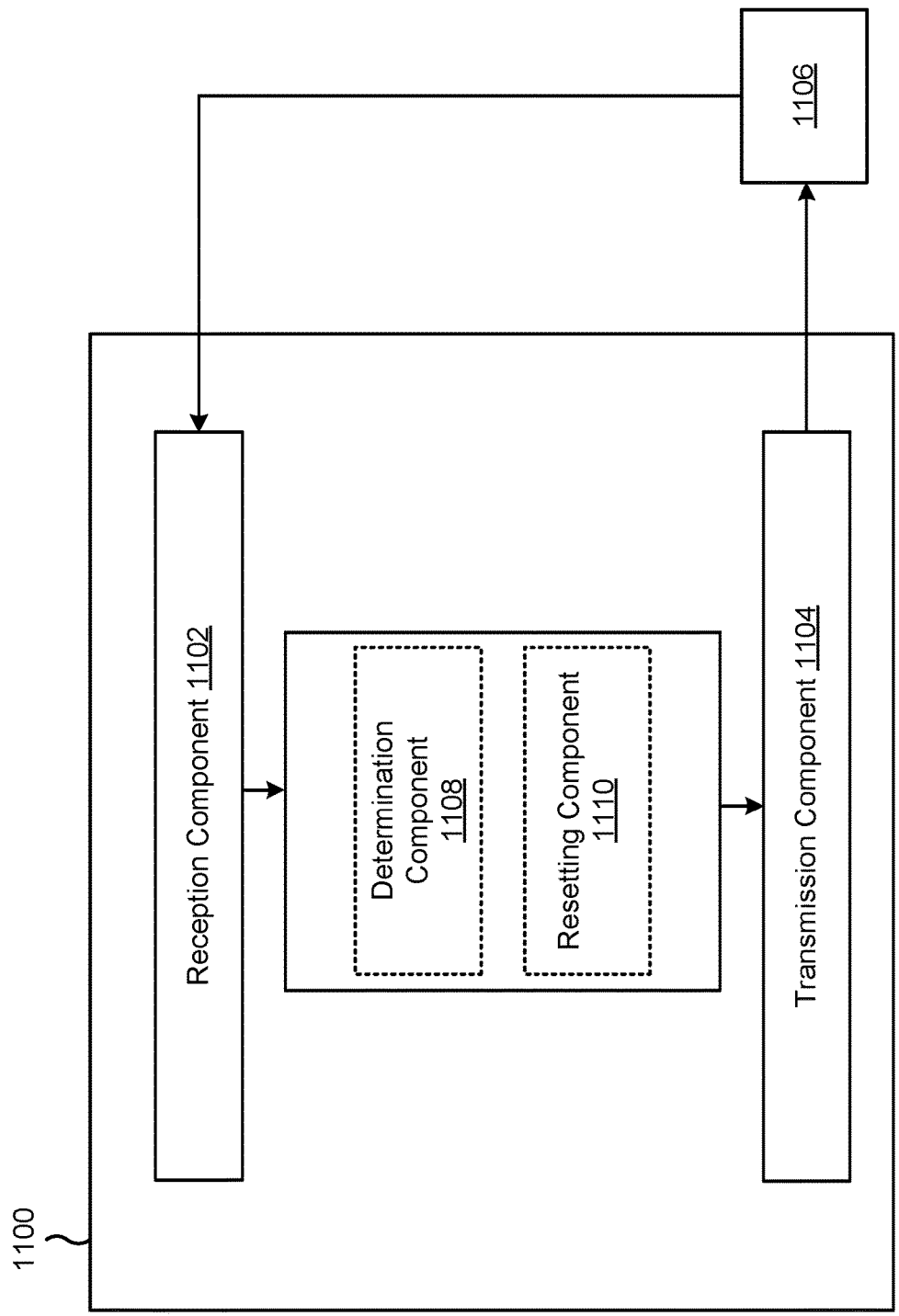
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108 or a resetting component 1110, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive an indication of a first CFR configured for multicast downlink communications and associate with a first BWP, and an indication of a second CFR configured for broadcast downlink communications and associated with a second BWP. The determination component 1108 may determine whether to switch a BWP for receiving downlink communications based at least in part on the indication of the first CFR and the indication of the second CFR.

The reception component 1102 may receive an indication of an active BWP, wherein determining whether to switch the BWP for receiving downlink communications comprises switching from an initial BWP to at least one of the first BWP associated with the first CFR configured for multicast downlink communications or a unicast BWP configured for unicast downlink communications based at least in part on the indication of the active BWP; and switching from the at least one of the first BWP associated with the first CFR or the unicast BWP to the second BWP associated with the second CFR based at least in part on expiration of a timer.

The reception component 1102 may receive, in the first CFR, downlink control information scheduling a multicast downlink communication, wherein the downlink control information is associated with a group radio network temporary identifier.

The resetting component 1110 may set or reset the timer based at least in part on decoding the downlink control information associated with the group radio network temporary identifier.

The reception component 1102 may receive, in the first CFR, the multicast downlink communication scheduled by the downlink control information.

The reception component 1102 may receive at least one of downlink control information associated with a unicast radio network temporary identifier in the unicast BWP or downlink control information associated with a group radio network temporary identifier in the first CFR.

The resetting component 1110 may reset the timer based at least in part on decoding the downlink control information associated with the unicast radio network temporary identifier or decoding the downlink control information associated with the group radio network temporary identifier.

The reception component 1102 may receive, in the first CFR, downlink control information associated with a group radio network temporary identifier.

The resetting component 1110 may reset the first timer based at least in part on decoding the downlink control information associated with the group radio network temporary identifier.

The reception component 1102 may receive, in the unicast BWP, downlink control information associated with a unicast radio network temporary identifier.

The resetting component 1110 may reset the second timer based at least in part on decoding the downlink control information associated with the unicast radio network temporary identifier.

The reception component 1102 may receive, in the first CFR, a multicast downlink communication.

The reception component 1102 may receive, in the unicast BWP, unicast downlink control information indicating dynamic bandwidth switching.

The determination component 1108 may determine whether to perform the dynamic bandwidth switching based at least in part on a priority associated with a unicast communication scheduled by the unicast downlink control information and a priority associated with the multicast downlink communication.

The reception component 1102 may receive, in the second CFR while in a radio resource control idle mode or a radio resource control inactive mode, a broadcast downlink communication.

The transmission component 1104 may transmit, to a base station, an indication of a maximum number of configured multicast CFRs for the UE.

The transmission component 1104 may transmit, to the base station, an indication of a maximum number of dormant multicast CFRs for the UE.

The transmission component 1104 may transmit, to the base station, an indication of a maximum number of activated multicast CFRs to be monitored simultaneously by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
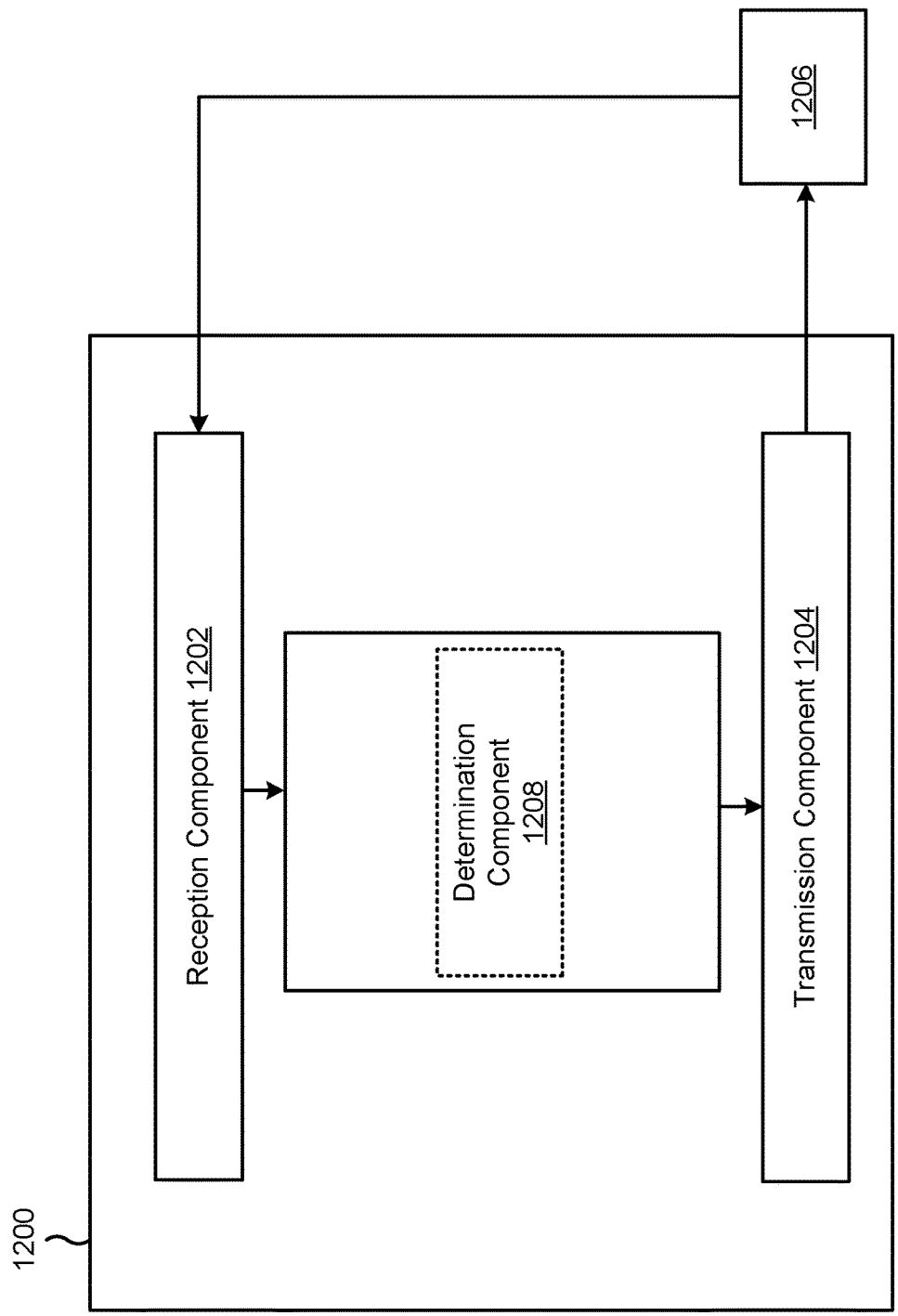

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a UE, an indication of a first CFR configured for multicast downlink communications and associated with a first BWP, and an indication of a second CFR configured for broadcast downlink communications and associated with a second BWP. The transmission component 1204 may transmit, to the UE, at least one of a multicast downlink communication in the first CFR or a broadcast downlink communication in the second CFR.

The transmission component 1204 may transmit, to the UE, an indication of an active BWP, wherein the active BWP is the first BWP associated with the first CFR configured for multicast downlink communications or a unicast BWP configured for unicast downlink communications. The determination component 1208 may determine the active BWP.

The transmission component 1204 may transmit, to the UE in the first CFR, downlink control information scheduling a multicast downlink communication, wherein the downlink control information is associated with a group radio network temporary identifier.

The transmission component 1204 may transmit, to the UE in the first CFR, the multicast downlink communication scheduled by the downlink control information.

The transmission component 1204 may transmit, to the UE, at least one of downlink control information associated with a unicast radio network temporary identifier in the unicast BWP or downlink control information associated with a group radio network temporary identifier in the first CFR.

The transmission component 1204 may transmit a broadcast downlink communication to the UE in the second CFR while the UE is in a radio resource control idle mode or a radio resource control inactive mode.

The reception component 1202 may receive, from the UE, an indication of a maximum number of configured multicast CFRs for the UE.

The reception component 1202 may receive, from the UE, an indication of a maximum number of dormant multicast CFRs for the UE.

The reception component 1202 may receive, from the UE, an indication of a maximum number of activated multicast CFRs to be monitored simultaneously by the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving an indication of a first common frequency resource (CFR) configured for multicast downlink communications and associated with a first bandwidth part, and an indication of a CFR configured for broadcast downlink communications and associated with a second bandwidth part; and determining whether to switch a bandwidth part for receiving downlink communications based at least in part on the indication of the first CFR and the indication of the second CFR.

Aspect 2: The method of Aspect 1, wherein the indication of the first CFR is included in at least one of a radio resource control communication, a medium access control (MAC) control element, or downlink control information.

Aspect 3: The method of any of Aspects 1-2, wherein the indication of the first CFR is included in configuration information identifying an initial bandwidth part, the first CFR configured for multicast downlink communications, and a unicast bandwidth part configured for unicast downlink communications.

Aspect 4: The method of Aspect 3, wherein the first CFR is included within the unicast bandwidth part, and wherein the first CFR is associated with a same bandwidth part identifier as that of the unicast bandwidth part.

Aspect 5: The method of any of Aspects 3-4, wherein the first CFR is one of multiple CFRs associated with multicast downlink communications identified in the configuration information, and wherein the multiple CFRs are associated with a same bandwidth part identifier.

Aspect 6: The method of Aspect 5, wherein each of the multiple CFRs is associated with a respective sub-bandwidth part identifier.

Aspect 7: The method of Aspect 5, wherein each of the multiple CFRs is associated with a respective radio network temporary identifier.

Aspect 8: The method of any of Aspects 3-7, wherein the indication of the second CFR is included in the configuration information.

Aspect 9: The method of Aspect 8, wherein the initial bandwidth part identified in the configuration information is the second CFR associated with broadcast downlink communications.

Aspect 10: The method of Aspect 8, wherein the indication of the second CFR is provided by an indication of a configured bandwidth part different from at least one of a type 0 control resource set (CORESET0) or an initial bandwidth part indicated in system information.

Aspect 11: The method of any of Aspects 1-7, wherein the indication of the second CFR is included in a system information block.

Aspect 12: The method of Aspect 11, wherein the second CFR is different than at least one of a type 0 control resource set (CORESET0) or an initial bandwidth part configured in the system information block.

Aspect 13: The method of Aspect 11, wherein the second CFR has a same size as a type 0 control resource set (CORESET0) or an initial BWP configured in the system information block.

Aspect 14: The method of any of Aspects 1-13, wherein the indication of the second CFR includes an indication of a first-type broadcast CFR that is the same as an initial bandwidth part and an indication of a second-type broadcast CFR that is different than the initial bandwidth part, further comprising: selecting the first-type broadcast CFR or the second-type broadcast CFR as the second CFR configured for broadcast downlink communications based at least in part on a capability or type of the UE.

Aspect 15: The method of any of Aspects 1-14, wherein determining whether to switch the bandwidth part for receiving downlink communications comprises: switching to the first bandwidth part associated with the first CFR to receive one or more multicast downlink communications.

Aspect 16: The method of any of Aspects 1-15, wherein determining whether to switch the bandwidth part for receiving downlink communications comprises: switching to the second bandwidth part associated with the second CFR to receive one or more broadcast downlink communications.

Aspect 17: The method of any of Aspects 1-16, further comprising receiving an indication of an active bandwidth part, wherein determining whether to switch the bandwidth part for receiving downlink communications comprises: switching from an initial bandwidth part to at least one of the first bandwidth part associated with the first CFR configured for multicast downlink communications or a unicast bandwidth part configured for unicast downlink communications based at least in part on the indication of the active bandwidth part; and switching from the at least one of the first bandwidth part associated with the first CFR or the unicast bandwidth part to the second bandwidth part associated with the second CFR based at least in part on expiration of a timer.

Aspect 18: The method of Aspect 17, wherein switching from the initial bandwidth part to the at least one of the first bandwidth part associated with the first CFR or the unicast bandwidth part comprises: switching to the first bandwidth part associated with the first CFR.

Aspect 19: The method of Aspect 18, further comprising: receiving, in the first CFR, downlink control information scheduling a multicast downlink communication, wherein the downlink control information is associated with a group radio network temporary identifier; and setting or resetting the timer based at least in part on decoding the downlink control information associated with the group radio network temporary identifier.

Aspect 20: The method of Aspect 19, further comprising: receiving, in the first CFR, the multicast downlink communication scheduled by the downlink control information.

Aspect 21: The method of any of Aspects 18-20, wherein the second CFR is included within the first CFR, further comprising: receiving at least one of a multicast downlink communication in the first CFR or a broadcast downlink communication in the second CFR.

Aspect 22: The method of any of Aspects 17-21, wherein switching from the initial bandwidth part to the at least one of the first bandwidth part associated with the first CFR or the unicast bandwidth part comprises: switching to the unicast bandwidth part, wherein the first CFR is included within the unicast bandwidth part.

Aspect 23: The method of Aspect 22, further comprising: receiving at least one of downlink control information associated with a unicast radio network temporary identifier in the unicast bandwidth part or downlink control information associated with a group radio network temporary identifier in the first CFR; and resetting the timer based at least in part on decoding the downlink control information associated with the unicast radio network temporary identifier or decoding the downlink control information associated with the group radio network temporary identifier.

Aspect 24: The method of any of Aspects 22-23, wherein switching from the unicast bandwidth part to the second bandwidth part associated with the second CFR is based at least in part on expiration of a first timer associated with the first CFR and a second timer associated with the unicast bandwidth part.

Aspect 25: The method of Aspect 24, further comprising: receiving, in the first CFR, downlink control information associated with a group radio network temporary identifier; and resetting the first timer based at least in part on decoding the downlink control information associated with the group radio network temporary identifier.

Aspect 26: The method of any of Aspects 24-25, further comprising: receiving, in the unicast bandwidth part, downlink control information associated with a unicast radio network temporary identifier; and resetting the second timer based at least in part on decoding the downlink control information associated with the unicast radio network temporary identifier.

Aspect 27: The method of any of Aspects 22-26, further comprising: receiving, in the first CFR, a multicast downlink communication; receiving, in the unicast bandwidth part, unicast downlink control information indicating dynamic bandwidth switching; and determining whether to perform the dynamic bandwidth switching based at least in part on a priority associated with a unicast communication scheduled by the unicast downlink control information and a priority associated with the multicast downlink communication.

Aspect 28: The method of any of Aspects 1-27, wherein a default bandwidth part for the UE is configured as the second CFR configured to broadcast downlink communications.

Aspect 29: The method of any of Aspects 1-28, further comprising: receiving, in the second CFR while in a radio resource control idle mode or a radio resource control inactive mode, a broadcast downlink communication.

Aspect 30: The method of any of Aspects 1-29, further comprising: transmitting, to a base station, an indication of a maximum number of configured multicast CFRs for the UE.

Aspect 31: The method of Aspect 30, further comprising: transmitting, to the base station, an indication of a maximum number of dormant multicast CFRs for the UE.

Aspect 32: The method of any of Aspects 30-31, further comprising: transmitting, to the base station, an indication of a maximum number of activated multicast CFRs to be monitored simultaneously by the UE.

Aspect 33: A method of wireless communication performed by a base station, comprising: transmitting, to a user equipment (UE), an indication of a first common frequency resource (CFR) configured for multicast downlink communications and associated with a first bandwidth part, and an indication of a second CFR configured for broadcast downlink communications and associated with a second bandwidth part; and transmitting, to the UE, at least one of a multicast downlink communication in the first CFR or a broadcast downlink communication in the second CFR.

Aspect 34: The method of Aspect 33, wherein the indication of the first CFR is included in at least one of a radio resource control communication, a medium access control (MAC) control element, or downlink control information.

Aspect 35: The method of any of Aspects 33-34, wherein the indication of the first CFR is included in configuration information identifying an initial bandwidth part, the first CFR configured for multicast downlink communications, and a unicast bandwidth part configured for unicast downlink communications.

Aspect 36: The method of Aspect 35, wherein the first CFR is included within the unicast bandwidth part, and wherein the first CFR is associated with a same bandwidth part identifier as the unicast bandwidth part.

Aspect 37: The method of any of Aspects 35-36, wherein the first CFR is one of multiple CFRs associated with multicast downlink communications identified in the configuration information, and wherein the multiple CFRs are associated with a same bandwidth part identifier.

Aspect 38: The method of Aspect 37, wherein each of the multiple CFRs is associated with a respective sub-bandwidth part identifier.

Aspect 39: The method of Aspect 37, wherein each of the multiple CFRs is associated with a respective radio network temporary identifier.

Aspect 40: The method of any of Aspects 35-39, wherein the indication of the second CFR is included in the configuration information.

Aspect 41: The method of Aspect 40, wherein the initial bandwidth part identified in the configuration information is the second bandwidth part configured for broadcast downlink communications.

Aspect 42: The method of any of Aspects 33-39, wherein the indication of the second CFR is included in a system information block.

Aspect 43: The method of Aspect 42, wherein the second CFR is different than at least one of a type 0 control resource set (CORESET0) and an initial bandwidth part configured in the system information block.

Aspect 44: The method of any of Aspects 33-43, wherein transmitting the at least one of the multicast downlink communication in the first CFR or the broadcast downlink communication in the second CFR comprises: transmitting one or more multicast downlink communications in the first CFR.

Aspect 45: The method of any of Aspects 33-44, wherein transmitting the at least one of the multicast downlink communication in the first CFR or the broadcast downlink communication in the second CFR comprises: transmitting one or more broadcast downlink communications in the second CFR.

Aspect 46: The method of any of Aspects 33-45, further comprising: transmitting, to the UE, an indication of an active bandwidth part, wherein the active bandwidth part is the first bandwidth part associated with the first CFR configured for multicast downlink communications or a unicast bandwidth part configured for unicast downlink communications.

Aspect 47: The method of Aspect 46, wherein the active bandwidth part is the first bandwidth part associated with the first CFR.

Aspect 48: The method of Aspect 47, further comprising: transmitting, to the UE in the first CFR, downlink control information scheduling a multicast downlink communication, wherein the downlink control information is associated with a group radio network temporary identifier; and transmitting, to the UE in the first CFR, the multicast downlink communication scheduled by the downlink control information.

Aspect 49: The method of Aspect 46, wherein the active bandwidth part is the unicast bandwidth part, and wherein the first CFR is included within the unicast bandwidth part.

Aspect 50: The method of Aspect 49, further comprising: transmitting, to the UE, at least one of downlink control information associated with a unicast radio network temporary identifier in the unicast bandwidth part or downlink control information associated with a group radio network temporary identifier in the first CFR.

Aspect 51: The method of any of Aspects 33-50, wherein a default bandwidth part for the UE is configured as the second CFR configured for broadcast downlink communications.

Aspect 52: The method of any of Aspects 33-51, further comprising: transmitting a broadcast downlink communication to the UE in the second CFR while the UE is in a radio resource control idle mode or a radio resource control inactive mode.

Aspect 53: The method of any of Aspects 33-52, further comprising: receiving, from the UE, an indication of a maximum number of configured multicast CFRs for the UE.

Aspect 54: The method of Aspect 53, further comprising: receiving, from the UE, an indication of a maximum number of dormant multicast CFRs for the UE.

Aspect 55: The method of any of Aspects 53-54, further comprising: receiving, from the UE, an indication of a maximum number of activated multicast CFRs to be monitored simultaneously by the UE.

Aspect 56: An apparatus for wireless communication at a device, comprising a processor; memory coupled with the processor; and instructions stored in the memory and executable by the processor to cause the apparatus to perform the method of one or more of Aspects 1-32.

Aspect 57: A device for wireless communication, comprising a memory and one or more processors coupled to the memory, the one or more processors configured to perform the method of one or more of Aspects 1-32.

Aspect 58: An apparatus for wireless communication, comprising at least one means for performing the method of one or more of Aspects 1-32.

Aspect 59: A non-transitory computer-readable medium storing code for wireless communication, the code comprising instructions executable by a processor to perform the method of one or more of Aspects 1-32.

Aspect 60: A non-transitory computer-readable medium storing a set of instructions for wireless communication, the set of instructions comprising one or more instructions that, when executed by one or more processors of a device, cause the device to perform the method of one or more of Aspects 1-32.

Aspect 61: An apparatus for wireless communication at a device, comprising a processor; memory coupled with the processor; and instructions stored in the memory and executable by the processor to cause the apparatus to perform the method of one or more of Aspects 33-55.

Aspect 62: A device for wireless communication, comprising a memory and one or more processors coupled to the memory, the one or more processors configured to perform the method of one or more of Aspects 33-55.

Aspect 63: An apparatus for wireless communication, comprising at least one means for performing the method of one or more of Aspects 33-55.

Aspect 64: A non-transitory computer-readable medium storing code for wireless communication, the code comprising instructions executable by a processor to perform the method of one or more of Aspects 33-55.

Aspect 65: A non-transitory computer-readable medium storing a set of instructions for wireless communication, the set of instructions comprising one or more instructions that, when executed by one or more processors of a device, cause the device to perform the method of one or more of Aspects 33-55.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive an indication of a first common frequency resource (CFR) configured for multicast downlink communications and associated with a first bandwidth part, and an indication of a second CFR configured for broadcast downlink communications and associated with a second bandwidth part; and
selectively perform bandwidth switching based at least in part on whether one of a reception of first downlink control information associated with a unicast communication or a reception of second downlink control information associated with a multicast communication occurs.

2. The UE of claim 1, wherein the indication of the first CFR is included in configuration information identifying an initial bandwidth part, the first CFR configured for multicast downlink communications, and a unicast bandwidth part configured for unicast downlink communications.

3. The UE of claim 2, wherein the first CFR is included within the unicast bandwidth part, and wherein the first CFR is associated with a same bandwidth part identifier as that of the unicast bandwidth part.

4. The UE of claim 2,
wherein the first CFR is one of multiple CFRs, and
wherein the multiple CFRs are associated with a same bandwidth part identifier.

5. The UE of claim 4, wherein each of the multiple CFRs is associated with at least one of a respective sub-bandwidth part identifier or a respective radio network temporary identifier.

6. The UE of claim 2, wherein the indication of the second CFR is included in the configuration information.

7. The UE of claim 2, wherein the initial bandwidth part is the second CFR configured for broadcast downlink communications.

8. The UE of claim 1, wherein the indication of the second CFR is provided by an indication of a configured BWP different from at least one of a type 0 control resource set (CORESET0) or an initial bandwidth part indicated in system information.

9. The UE of claim 1, wherein the indication of the second CFR is included in a system information block.

10. The UE of claim 9, wherein the second CFR is different than at least one of a type 0 control resource set (CORESET0) or an initial bandwidth part configured in the system information block.

11. The UE of claim 9, wherein the second CFR has a same size as a type 0 control resource set (CORESET0) or an initial BWP configured in the system information block.

12. The UE of claim 11, wherein the one or more processors are further configured to:
receive, in a unicast bandwidth part, the first downlink control information.

13. The UE of claim 1, wherein the indication of the second CFR includes an indication of a first-type broadcast CFR that is the same as an initial bandwidth part and an indication of a second-type broadcast CFR that is different than the initial bandwidth part, wherein the one or more processors are further configured to:
select the first-type broadcast CFR or the second-type broadcast CFR as the second CFR configured for broadcast downlink communications based at least in part on a capability or type of the UE.

14. The UE of claim 1, wherein the one or more processors, to selectively perform bandwidth switching, are further configured to:
switch to the first bandwidth part associated with the first CFR.

15. The UE of claim 1, wherein the one or more processors are further configured to:
switch to the second bandwidth part associated with the second CFR to receive one or more broadcast downlink communications.

16. The UE of claim 1, wherein the one or more processors, to selectively perform bandwidth switching, are configured to:
switch based at least in part on expiration of a timer.

17. The UE of claim 16, wherein the one or more processors, to selectively perform bandwidth switching, are configured to:
set or reset the timer based at least in part on the second downlink control information, wherein the second downlink control information is associated with a group radio network temporary identifier.

18. The UE of claim 1, wherein the one or more processors are further configured to:
receive, in the first CFR, the multicast communication based on the second downlink control information.

19. The UE of claim 1, wherein the second CFR is included within the first CFR, and wherein the one or more processors are configured to:
receive at least one of the multicast communication in the first CFR or a broadcast downlink communication in the second CFR.

20. The UE of claim 1, wherein the first downlink control information is associated with a unicast radio network temporary identifier.

21. The UE of claim 1, wherein the one or more processors are further configured to:
receive, in the first CFR, the second downlink control information; and
reset a timer based at least in part on decoding the second downlink control information.

22. The UE of claim 1, wherein a default bandwidth part for the UE is configured as the second CFR configured for broadcast downlink communications.

23. The UE of claim 1, wherein the one or more processors are further configured to:
receive, in the second CFR while in a radio resource control idle mode or a radio resource control inactive mode, a broadcast downlink communication.

24. The UE of claim 1, wherein the one or more processors are further configured to:

transmit at least one of an indication of a maximum number of configured multicast CFRs for the UE, an indication of a maximum number of dormant multicast CFRs for the UE, or a maximum number of activated multicast CFRs to be monitored simultaneously by the UE.

25. The UE of claim 1, wherein the second downlink control information indicates a priority associated with the multicast communication.

26. The UE of claim 1, wherein the second CFR is same or larger than an initial bandwidth part.

27. The UE of claim 1, wherein the one or more processors, to selectively perform the bandwidth switching, are configured to:
perform the bandwidth switching based on at least the reception of the first downlink control information.

28. A method of wireless communication performed by a user equipment (UE), comprising:
receiving an indication of a first common frequency resource (CFR) configured for multicast downlink communications and associated with a first bandwidth part, and an indication of a second CFR configured for broadcast downlink communications and associated with a second bandwidth part; and
selectively performing bandwidth switching based at least in part on whether one of a reception of first downlink control information associated with a unicast communication or a reception of second downlink control information associated with a multicast communication occurs.

29. A non-transitory computer-readable medium storing a set of instructions for wireless communication, the set of instructions comprising:
one or more instructions that, when executed by one or more processors of a user equipment (UE), cause the UE to:
receive an indication of a first common frequency resource (CFR) configured for multicast downlink communications and associated with a first bandwidth part, and an indication of a second CFR configured for broadcast downlink communications and associated with a second bandwidth part; and
selectively perform dynamic bandwidth switching based at least in part on whether one of a reception of first downlink control information associated with a unicast communication or a reception of second downlink control information associated with a multicast communication occurs.

30. An apparatus for wireless communication, comprising:
means for receiving an indication of a first common frequency resource (CFR) configured for multicast downlink communications and associated with a first bandwidth part, and an indication of a second CFR configured for broadcast downlink communications and associated with a second bandwidth part; and
means for selectively performing bandwidth switching based at least in part on whether one of a reception of first downlink control information associated with a unicast communication or a reception of second downlink control information associated with a multicast communication occurs.

* * * * *